US010386521B2

(12) United States Patent
Hartland et al.

(10) Patent No.: US 10,386,521 B2
(45) Date of Patent: Aug. 20, 2019

(54) ELEVATOR SYSTEM ON A SUBSEA DEVICE FOR TRANSFER OF SUBSEA PAYLOAD

(71) Applicant: Seabed Geosolutions B.V., Leidschendam (NL)

(72) Inventors: Martin John Hartland, Katy, TX (US); Brendan James Reid, Maylands (AU); Benjamin Jeremy Ash, Lynwood (AU)

(73) Assignee: Seabed Geosolutions B.V., Leidschendam (NL)

( * ) Notice: Subject to any disclaimer, the term of this patent is extended or adjusted under 35 U.S.C. 154(b) by 0 days.

(21) Appl. No.: 15/903,607

(22) Filed: Feb. 23, 2018

(65) Prior Publication Data

US 2018/0252831 A1   Sep. 6, 2018

Related U.S. Application Data

(60) Provisional application No. 62/466,232, filed on Mar. 2, 2017.

(51) Int. Cl.
| | | |
|---|---|---|
| *B63B 27/32* | (2006.01) | |
| *G01V 1/38* | (2006.01) | |
| *B63B 27/16* | (2006.01) | |
| *G05D 1/02* | (2006.01) | |
| *B63G 8/00* | (2006.01) | |

(52) U.S. Cl.
CPC ............ *G01V 1/3852* (2013.01); *B63B 27/16* (2013.01); *B63B 27/32* (2013.01); *B63G 8/001* (2013.01); *G05D 1/0206* (2013.01); *G01V 2210/1427* (2013.01)

(58) Field of Classification Search
CPC combination set(s) only.
See application file for complete search history.

(56) References Cited

U.S. PATENT DOCUMENTS

| 6,975,560 B2 | 12/2005 | Berg et al. |
| 7,210,556 B2 | 5/2007 | Bath et al. |

(Continued)

OTHER PUBLICATIONS

Klaas Koster et al., "Mitigating drilling hazards in the North Sea using ocean-bottom seismic", World Oil, Jul. 1, 2011, XP055183765.

*Primary Examiner* — Kyle Armstrong
(74) *Attorney, Agent, or Firm* — Park, Vaughan, Fleming & Dowler LLP; Shane Nelson

(57) ABSTRACT

A system, apparatus, and method for transferring a subsea payload (such as seismic nodes) at a subsea position by using an elevator system located on a subsea basket. A plurality of seismic nodes may be located on a plurality of support slides, trays, or other node holders at different levels within the basket. The elevator system is configured to move the seismic nodes between different heights within the basket for external transfer from one or more vertical positions. During transfer operations between a subsea basket and an underwater vehicle (e.g., ROV), the desired level of seismic nodes may be positioned to the desired vertical position within the basket and transferred to the ROV by various transfer mechanisms, such as an extendable stinger or chain drive. Multiple levels of seismic nodes (or node holders) may be transferred between the basket and ROV during a single subsea docking.

18 Claims, 12 Drawing Sheets

(56) References Cited

U.S. PATENT DOCUMENTS

| | | |
|---|---|---|
| 7,324,406 B2 | 1/2008 | Berg |
| 7,632,043 B2 | 12/2009 | Thompson et al. |
| 8,310,899 B2 | 11/2012 | Woodard, Jr. et al. |
| 8,611,181 B2 | 12/2013 | Woodward, Jr. et al. |
| 9,090,319 B2 | 7/2015 | Brizard et al. |
| 9,415,848 B2 | 8/2016 | Jewell |
| 2006/0159524 A1 | 7/2006 | Thompson et al. |
| 2011/0217123 A1 | 9/2011 | Jewell et al. |
| 2015/0284060 A1 | 10/2015 | Jewell et al. |
| 2016/0041284 A1* | 2/2016 | Rokkan ............... G01V 1/3843 29/428 |
| 2016/0121983 A1 | 5/2016 | Rokkan et al. |

\* cited by examiner

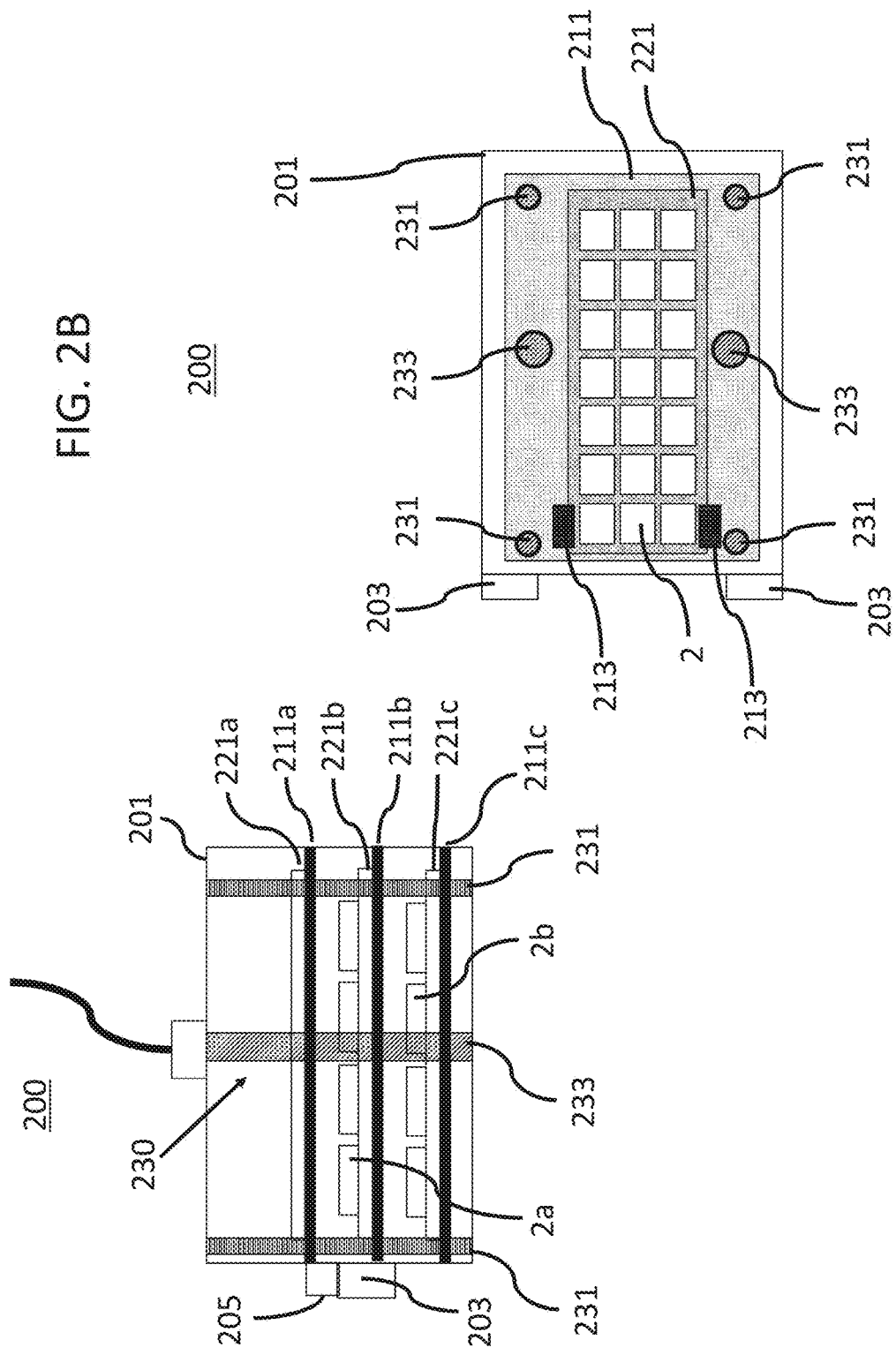

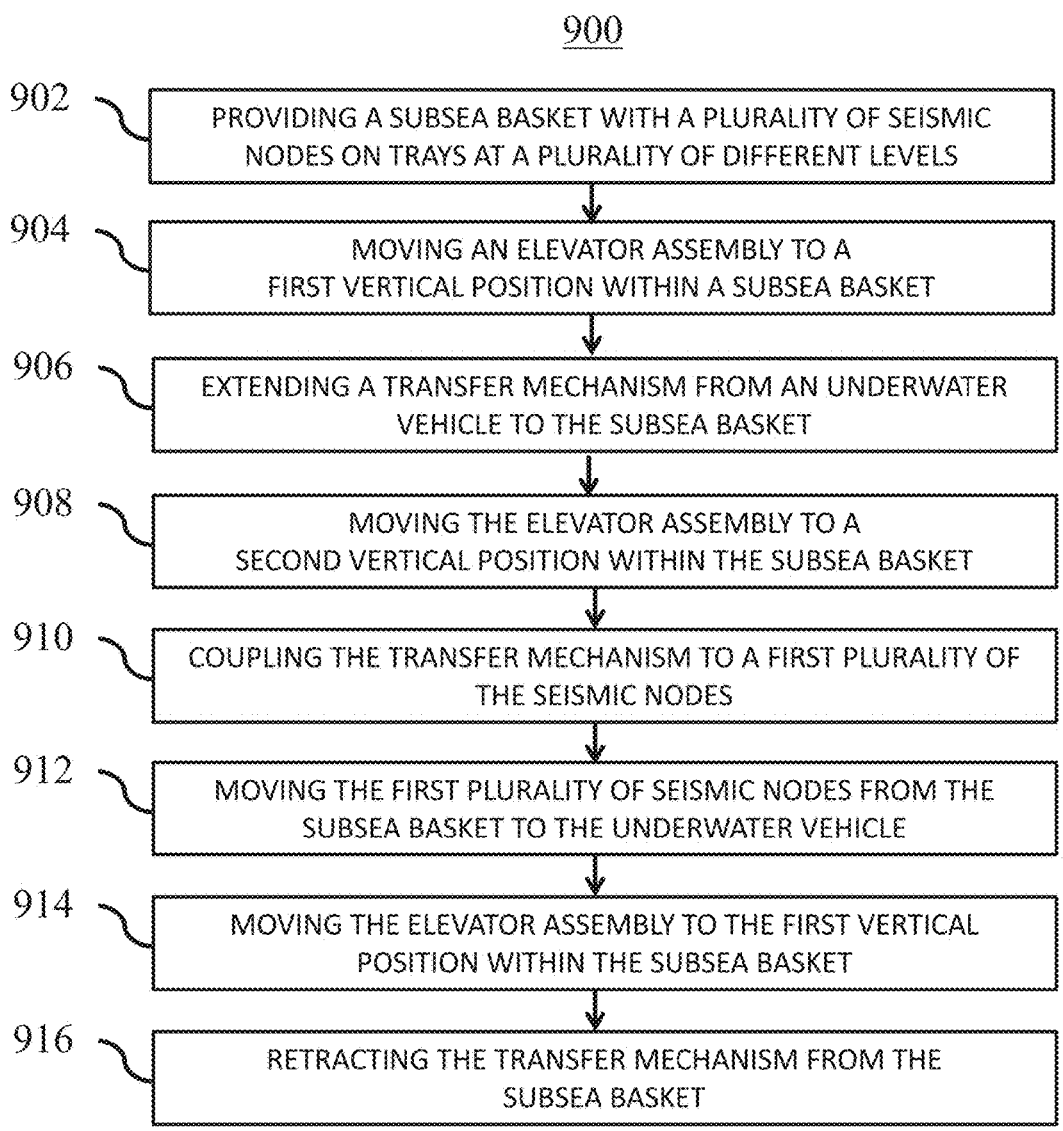

ELEVATOR SYSTEM ON A SUBSEA DEVICE FOR TRANSFER OF SUBSEA PAYLOAD

PRIORITY

This application claims priority to U.S. provisional patent application No. 62/466,232, filed on Mar. 2, 2017, the entire content of which is incorporated herein by reference.

BACKGROUND OF THE INVENTION

Field of the Invention

This invention relates to the use of elevator assemblies in underwater structures and more particularly relates to a subsea underwater basket or underwater vehicle with an elevator system for moving a plurality of seismic nodes (or node holders) between the underwater vehicle and basket.

Description of the Related Art

Marine seismic data acquisition and processing generates a profile (image) of a geophysical structure under the seafloor. Reflection seismology is a method of geophysical exploration to determine the properties of the Earth's subsurface, which is especially helpful in determining an accurate location of oil and gas reservoirs or any targeted features. Marine reflection seismology is based on using a controlled source of energy (typically acoustic energy) that sends the energy through seawater and subsurface geologic formations. The transmitted acoustic energy propagates downwardly through the subsurface as acoustic waves, also referred to as seismic waves or signals. By measuring the time it takes for the reflections or refractions to come back to seismic receivers (also known as seismic data recorders or nodes), it is possible to evaluate the depth of features causing such reflections. These features may be associated with subterranean hydrocarbon deposits or other geological structures of interest.

In general, either ocean bottom cables (OBC) or ocean bottom nodes (OBN) are placed on the seabed. For OBC systems, a cable is placed on the seabed by a surface vessel and may include a large number of seismic sensors, typically connected every 25 or 50 meters into the cable. The cable provides support to the sensors, and acts as a transmission medium for power to the sensors and data received from the sensors. One such commercial system is offered by Sercel under the name SeaRay®. Regarding OBN systems, and as compared to seismic streamers and OBC systems, OBN systems have nodes that are discrete, autonomous units (no direct connection to other nodes or to the marine vessel) where data is stored and recorded during a seismic survey. One such OBN system is offered by the Applicant under the name Trilobit®. For OBN systems, seismic data recorders are placed directly on the ocean bottom by a variety of mechanisms, including by the use of one or more of Autonomous Underwater Vehicles (AUVs), Remotely Operated Vehicles (ROVs), by dropping or diving from a surface or subsurface vessel, or by attaching autonomous nodes to a cable that is deployed behind a marine vessel.

Autonomous ocean bottom nodes are independent seismometers, and in a typical application they may be self-contained units comprising a housing, frame, skeleton, or shell that includes various internal components such as geophone and hydrophone sensors, a data recording unit, a reference clock for time synchronization, and a power source. The power sources are typically battery-powered, and in some instances the batteries are rechargeable. In operation, the nodes remain on the seafloor for an extended period of time. Once the data recorders are retrieved, the data is downloaded and batteries may be replaced or recharged in preparation of the next deployment. Various designs of ocean bottom autonomous nodes are well known in the art. See, e.g., U.S. Pat. No. 9,523,780 (citing patents and publications), incorporated herein by reference. Still further, the autonomous seismic node may be integrated with an AUV such that the AUV, at some point subsea, may either travel to or from the seabed at a predetermined position. See, e.g., U.S. Pat. No. 9,090,319, incorporated herein by reference. In general, the basic structure and operation of an autonomous seismic node is well known to those of ordinary skill.

Marine seismic surveys need a fast and cost-effective system for deploying and recovering autonomous seismic receivers that are configured to operate underwater. One conventional method (as illustrated in FIG. 1) is to deploy a ROV in a body of water while also deploying a separate underwater node transfer device, such as a basket that is configured to hold a plurality of seismic nodes and be lowered and raised from a surface vessel. At a certain subsea position, the ROV docks or mates with the node transfer device and transfers one or more nodes from the node transfer device to the ROV. The ROV then places the retrieved nodes at one or more positions on the seabed. Prior art patents and publications illustrating this option include at least the following: U.S. Pat. Nos. 6,975,560; 7,210,556; 7,324,406; 7,632,043; 8,310,899; 8,611,181; 9,415,848; 9,873,496, and U.S. Patent Application Publication Nos. 2006/0159524 and 2015/0284060, each of which are incorporated herein by reference.

The prior art systems for retrieving seismic nodes from an underwater basket are problematic. They are difficult to couple the ROV to the basket. They are difficult to transfer the seismic nodes from the basket to the ROV. They are limited in the shape and size of nodes that can be deployed by the basket and carried/transferred by the ROV. Further, if multiple levels of nodes are to be transferred between a ROV and the basket, the ROV must typically re-dock with the basket at a different position and then transfer the separate level of nodes during separate docking procedures. Such systems are slow and not cost effective.

A need exists for an improved method and system for deploying and retrieving subsea equipment from a surface vessel to a subsea position on or near the bottom of the ocean. A need exists for an improved seismic node handling system on an ROV and a subsea basket. A need exists for an improved underwater basket that is able to hold a plurality of autonomous seismic nodes and move those nodes between different vertical and horizontal positions within the basket. A need exists for an improved system for a ROV and basket to dock and transfer a seismic payload at a subsea position.

SUMMARY OF THE INVENTION

A system, apparatus, and method for transferring a subsea payload (such as seismic nodes) at a subsea position by using an elevator system located on a subsea basket. A plurality of seismic nodes may be located on a plurality of support slides, trays, or other node holders at different levels within the basket. The elevator system is configured to move the seismic nodes between different heights within the basket for external transfer from one or more vertical positions. During transfer operations between a subsea basket and an underwater vehicle (e.g., ROV), the desired level of seismic nodes may be positioned to the desired vertical position within the basket and transferred to the ROV by various transfer mechanisms, such as an extendable stinger or chain drive. Multiple levels of seismic nodes (or node holders) may be transferred between the basket and ROV during a single subsea docking.

In one embodiment, disclosed is a subsea basket for the subsea transfer of a plurality of seismic nodes, comprising a frame, an elevator assembly coupled to the frame, and a plurality of seismic nodes coupled to the elevator assembly. The elevator assembly is configured to vertically move the plurality of seismic nodes within the frame between a plurality of different vertical heights and/or levels. In one embodiment, the subsea basket may comprise a plurality of node holders (such as trays), wherein each node holder is configured to hold a portion of the plurality of seismic nodes. In other embodiments, the seismic nodes may simply rest on fixed or sliding support rails or slides. The seismic nodes and/or plurality of node holders may comprise a locking mechanism for securing the nodes and/or node holders to the subsea basket. This locking mechanism may be unlocked during docking with an underwater vehicle. The basket may comprise a plurality of position indicators configured to position the plurality of seismic nodes at one or more predetermined vertical positions within the frame. The basket may comprise a plurality of stabilizing devices coupled to a plurality of corners on the frame, which may or may not be manually or automatically retractable.

The elevator assembly may comprise a plurality of lead screw assemblies and/or hydraulic cylinders that is configured to move the plurality of seismic nodes between different vertical positions within the subsea basket. The elevator assembly may be configured to be powered by a remotely operated vehicle, such as by a hot stab of the ROV. The elevator assembly may comprise a plurality of vertical guiding rods to help stabilize and/or support each level of seismic nodes within the elevator assembly/basket. In one embodiment, the plurality of seismic nodes comprises a first plurality of seismic nodes at a first vertical height in the subsea basket and a second plurality of seismic nodes at a second vertical height in the subsea basket. The elevator assembly may be configured to vertically move the first plurality of seismic nodes and the second plurality of seismic at the same time, or may be configured to move each level of seismic nodes separately.

In one embodiment, disclosed is a system for the subsea transfer of a plurality of seismic nodes, comprising a seismic node transfer device configured to hold a plurality of seismic nodes at a plurality of different levels within the node transfer device and an underwater vehicle configured to transfer the plurality of seismic nodes from the node transfer device to the underwater vehicle. The seismic node transfer device may be a subsea basket and the underwater vehicle may be a remotely operated vehicle (ROV). The node transfer device (or ROV) may comprise an elevator assembly coupled to the plurality of seismic nodes, wherein the elevator assembly is configured to vertically move the plurality of seismic nodes between a plurality of different levels or vertical position within the node transfer device (or ROV). In one embodiment, the ROV may comprise a transfer mechanism (such as a stinger mechanism) that is configured to extend and retract from the ROV and transfer the plurality of seismic nodes from the subsea basket to the ROV. This may include transferring and/or coupling to a tray or other node holder. In one embodiment, the ROV and subsea basket are configured to transfer seismic nodes from different vertical levels at a single docking position and/or vertical position. For example, the plurality of seismic nodes may comprise a first plurality of seismic nodes at a first vertical height in the subsea basket and a second plurality of seismic nodes at a second vertical height in the subsea basket, such that the ROV is configured to transfer the first and second plurality of seismic nodes from the subsea basket to the ROV at a single docking position.

In one embodiment, disclosed is a method for the subsea transfer of seismic nodes, comprising coupling an underwater vehicle to a subsea basket, wherein the subsea basket comprises a first plurality of seismic nodes at a first vertical position, positioning the first plurality of seismic nodes in the node basket from the first vertical position to a second vertical position within the subsea basket, and transferring the first plurality of seismic nodes from the subsea basket to the underwater vehicle. The method may further comprise vertically moving the first plurality of seismic nodes within the subsea basket by actuating one or more lead screw assemblies or hydraulic cylinders within the subsea basket. The method may further comprise extending a transfer mechanism from the underwater vehicle into the subsea basket and coupling the transfer mechanism to the first plurality of seismic nodes. The method may further comprise transferring a node holder from the subsea basket to the underwater vehicle, wherein the first plurality of seismic nodes is positioned on the node holder. The method may further comprise transferring an empty tray (or node holder) between the subsea basket and ROV. The method may further comprise transferring multiple levels or seismic nodes (with or without trays) from the subsea basket to the ROV at the same docking step.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIGS. 2A-2B illustrate one embodiment of a subsea deployment basket, from a side and top view, respectively.

FIG. 9 illustrates one embodiment of a method of transferring a plurality of seismic nodes from a deployment basket to a ROV.

DETAILED DESCRIPTION

Various features and advantageous details are explained more fully with reference to the nonlimiting embodiments that are illustrated in the accompanying drawings and detailed in the following description. Descriptions of well known starting materials, processing techniques, components, and equipment are omitted so as not to unnecessarily obscure the invention in detail. It should be understood, however, that the detailed description and the specific examples, while indicating embodiments of the invention, are given by way of illustration only, and not by way of limitation. Various substitutions, modifications, additions, and/or rearrangements within the spirit and/or scope of the underlying inventive concept will become apparent to those skilled in the art from this disclosure. The following detailed description does not limit the invention.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures, or characteristics may be combined in any suitable manner in one or more embodiments.

Figure 1:
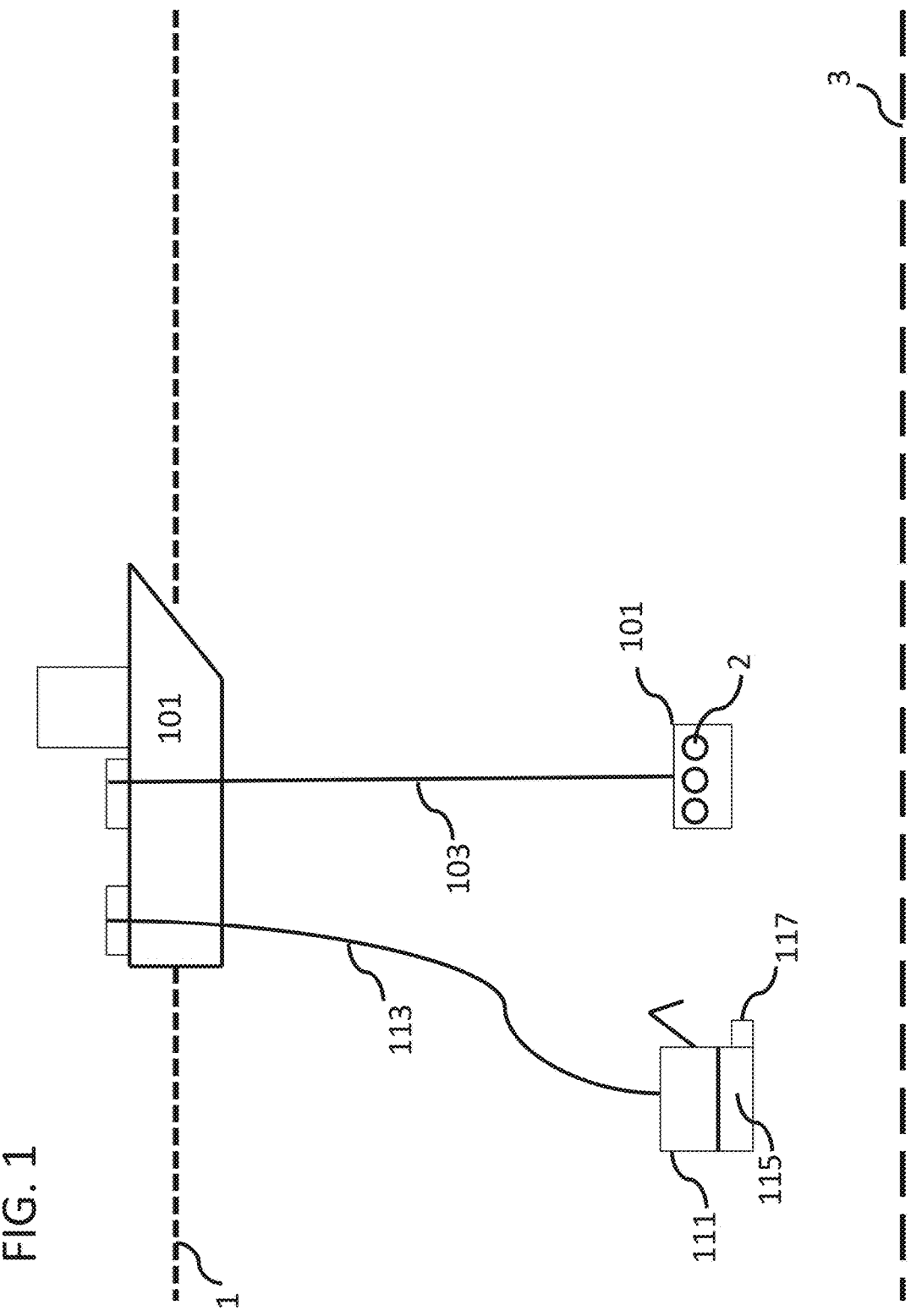
FIG. 1 illustrates one embodiment of a deployment system from a marine vessel.

FIG. 1 shows one embodiment of the present disclosure. Seismic devices, such as autonomous seismic nodes, may be lowered from a marine surface vessel to a subsea position for transferring of those nodes to an unmanned underwater vehicle (UUV), such as a remotely operated vehicle (ROV). ROV 111 may be deployed from surface vessel 101 from the surface of a water body, such as sea surface 1. The ROV may be coupled to the surface vessel while in the water via deployment line 113, such as a tether, cable, wire, or rope, as is known in the prior art. Surface vessel 101 is shown in a simplified version in FIG. 1, and one of skill in the art will realize that many more components may be located on the back deck of the vessel for standard vessel operations. For example, one or more launch and recovery systems (LARS) may be located on the back deck of the vessel, which is used to deploy and recover the ROV. While not illustrated for simplicity purposes, for some types of subsea equipment (such as an ROV), deployment line 113 may consist of separate sections, such as a tether section and an umbilical section. For example, as is known in the art, if subsea equipment 111 is an ROV (such as the FUGRO FCV3000 or other similar ROV), the ROV is coupled to a tether management system (TMS) via a first wire segment (or tether) and the TMS is connected to the surface vessel via a second wire segment (such as an umbilical cable). In general, for the purposes of this disclosure, some or all of the portions of an ROV's tether and/or umbilical cable (or other similar subsea device) may be generally considered as the ROV's deployment line. In other embodiments, an autonomous underwater vehicle (AUV) or other UUV may be used instead of an ROV.

In one embodiment, the ROV may have a skid or other payload storage system 115 for storing one or more payload devices and/or for transferring such payload devices from the subsea basket 101 to the ROV 111. For example, skid 115 may comprise or be coupled to docking system 117 for docking and/or coupling ROV 111 to subsea basket 101, which may or may not have a corresponding collar or docking mechanism to mate with the docking system of the ROV. Skid 115 may be located on an underside of the ROV (as shown in FIG. 1) and/or may be partially located on a front, back, or side portion of the ROV. In some embodiments, seismic nodes 2 may be stored and/or handled by a plurality of grabbers, grippers, manipulators, or other single node handling devices (including conveyors, trays, and other seismic transfer mechanisms), as described herein, which may be located within and/or coupled to skid 115. Thus, a wide variety of ROVs may be used with the docking system of the present disclosure.

Subsea equipment 101 may be lowered from surface vessel 101 via cable/line 103. Subsea equipment 101 may be a cage, basket, skid or any other transfer device capable of holding a plurality of payload units, such as a plurality of ocean bottom autonomous seismic nodes 2 in a body of water and transferring those nodes to an external device, such as an ROV. Thus, in one embodiment, subsea device 101 is a node transfer device. At various operational stages node transfer device 101 may be located near the water surface, at a subsea position between the seabed and the surface, near the seabed, or on the seabed. In one embodiment, the ROV and/or node transfer device may be moving in the body of water with a speed based on movement of the subsea structure, movement of the vessel, and/or current movement. Thus, ROV 111 and subsea basket 101 may mate and/or couple at a position above the seabed while one or both devices are moving. In one embodiment, the ROV and the node transfer device each comprise acoustic modems that are configured to communicate with each other via acoustic communications.

While various ROVs and other subsea devices may be used with the embodiments presented in this disclosure, the present disclosure is not limited to any particular ROV, underwater vehicle, subsea transfer device, or configuration thereof to deploy the autonomous seismic nodes on the seabed. Similarly, while one application of the present disclosure is directed to ROVs and subsea baskets used for seismic node deployment in a body of water (such as ocean bottom seismic nodes placed on the seabed), the present disclosure is not limited to such an application or subsea transfer device, and is generally useful for any docking arrangement between a first subsea device and a second subsea device and for the transfer of one or more payload devices between the first and second subsea devices.

As mentioned above, existing prior art subsea transfer systems for seismic nodes have difficulty effectively and efficiently transferring seismic nodes between an underwater vehicle and a subsea device, such as a subsea basket. The present disclosure solves prior art docking and transfer difficulties in part by utilizing a vertical elevator system that moves a plurality of different seismic nodes (whether located on support sides, trays, node holders, or platforms) between different vertical heights to a single vertical height within the subsea basket for transfer of those seismic nodes to the ROV at that particular vertical height. Thus, for a single docking position (or docking step), a plurality of separate levels of seismic nodes (such as a plurality of separate trays or node holders) may be transferred to the ROV, thereby eliminating multiple docking positions for a subsea basket and multiple docking steps. The disclosed elevator assembly is not limited to a particular docking or transfer mechanism, and a wide variety of docking or transfer mechanisms of the ROV may be used to couple and/or transfer the seismic nodes from the subsea basket of the present disclosure.

Subsea Deployment Basket

FIGS. 2A and 2B illustrate one embodiment of a subsea deployment basket of the present application, from a side and top cross-sectional view, respectively. Subsea deployment basket 200 is configured to hold a plurality of autonomous seismic nodes 2 in a plurality of trays 221 within a plurality of platforms or bays 211. Each platform or bay 211 (and subsequently the coupled tray) is positioned at a different vertical position within frame 201 of the basket. In some embodiments, a tray is not used and each particular level or bay may comprise a plurality of rails on which the seismic nodes sit. Subsea deployment basket 200 may be substantially similar to subsea deployment basket 101 in that it can be lowered from a surface vessel and coupled to an underwater vehicle (such as an ROV) to transfer autonomous seismic nodes (or another subsea payload) to and from the underwater vehicle. In other embodiments, subsea basket 200 may be a structure permanently located on the seabed, coupled to a subsea device that may be lowered/raised from and to a surface vessel, or be coupled to a subsea device that is temporarily or permanently located in a subsea position.

In one embodiment, each tray 221 is configured to be held within subsea deployment basket 200 as well as by the ROV, such as within ROV skid 115 or similar device. In one embodiment, the trays are manually or automatically loaded with seismic nodes on the back deck of a surface vessel. Likewise, the trays may be manually or automatically loaded or unloaded to or from the subsea basket while on the back deck of the vessel. The subsea basket is then positioned from the surface vessel to a subsea position as is known in the art. After the subsea basket and ROV are docked and/or coupled together at a subsea position, each of the trays may be transferred to the ROV. Once the trays are transferred to the ROV, as is known in the art, the ROV may have a manipulator arm that specifically positions each node on the seabed and transfers the seismic nodes to and from the ROV and the seabed. In other embodiments, if the seismic nodes are seismic AUVs, the seismic nodes may automatically fly or travel away from the ROV as is disclosed in U.S. Pat. No. 9,873,496, incorporated herein by reference.

In one embodiment, deployment basket 200 comprises a plurality of platforms, levels, or bays 211 in which a plurality of seismic nodes may be located, such as being located on one or more trays or rails. In one embodiment, the deployment basket comprises three platform assemblies 211 at different vertical heights, each of which can hold tray 221 (e.g., one tray for each platform/bay/level). For example, tray platform 211a is positioned at a first height, tray platform 211b is positioned at a second height, and tray platform 211c is positioned at a third height. Likewise, tray 221a is positioned at a first height, tray 221b is positioned at a second height, and tray 221c is positioned at a third height. In the embodiment described herein, each tray 221 sits directly on tray platform 221. More or less levels and trays are possible depending on the size of the deployment basket and seismic node. Depending on the operational stage of the deployment basket, the trays may be empty or full with seismic nodes. In other embodiments, the tray can hold any type of seismic payload, such as transponders or acoustic positioning devices, as well as any other subsea payload outside of the seismic industry. Each tray 221 (and/or platform 211) may be located at a different vertical height in the subsea deployment basket and be moved between different vertical heights within the subsea basket by elevator system or assembly 230. In one embodiment, the elevator assembly moves each level of seismic nodes within the basket (such as tray platform 211 along with coupled tray 221) between different vertical positions within the subsea basket 200 and/or frame 201. Basket frame assembly 201 may be coupled to elevator assembly 230 at one or more positions within the frame. In one embodiment, elevator assembly 230 may comprise one or more hydraulic cylinders or lead screws or other actuating devices to move the elevator assembly (or a portion thereof) from a first vertical position to a second vertical position.

Elevator system or assembly 230 may comprise a plurality of rods or guides 231 coupled to each of the levels of seismic nodes (such as platform assemblies 211) and to basket frame 201. In one embodiment, vertical guides 231 allow the platform assembly to travel vertically within the basket along the guides and to maintain stability and a stabilized horizontal position. In one embodiment, each tray platform 211 has a plurality of holes or openings in which guides 231 travel. In one embodiment, the elevator system 230 may have four lead-screw guides 231, with two guides being located on opposing sides (such as a left and right side) of each tray basket, such as substantially in the corners of the tray platform and basket frame 201. In other embodiments, only one guide may be located at one or more sides or sections of the tray platforms.

Elevator assembly 230 may also comprise a vertical actuator 233 coupled to one or more of the tray platforms 211 (or horizontal rails, in other embodiments) for vertical movement within the basket. The vertical actuator may be one or more hydraulic cylinders or lead screws. In one embodiment, two lead screw assemblies 233 are used (one mounted on each side of tray platform 211 and frame assembly 201) and are used for vertical raising and lowering of the tray platforms and/or each level of seismic nodes. In one embodiment, each leadscrew may be coupled to a leadscrew motor (not shown) that actuates lead screws 233 between different vertical positions. In one embodiment, each lead screw may be an off chain synchronized fixed shaft lead screw. If a tray and/or tray platform configuration is used, each tray platform 211 may have a plurality of holes or openings (with corresponding threads) in which the lead screws 233 travel, thereby moving the coupled tray platforms. In still other embodiments, instead of and/or in addition to the lead screw assemblies described herein, elevator assembly 230 may comprise one or more hydraulic cylinders, rack and pinion systems, etc. for vertical movement of the tray platforms.

In one embodiment, elevator system 230 (such as lead-screw assemblies and guides) allows the tray platforms (and trays) to be elevated or lowered as required to interface with an ROV (or an ROV skid) at a subsea position or an unloading/loading robot on a back deck of a surface vessel. In one embodiment, each of the tray platforms is moved an equal vertical distance with any movement of a single tray platform, while in other embodiments each tray platform may be individually moved vertically without movement of the other tray platforms. Thus, movement of a single level of seismic nodes moves the other levels of seismic nodes accordingly. In one embodiment, positions for the tray platforms 221 within the subsea basket are adjustable to allow a tray loading interface by a back-deck robot or ROV skid.

In one embodiment, each tray platform 211 has one or more soft locking mechanisms 213 that interface with corresponding profiled indents on each tray 221 to capture the tray once it is loaded on tray platform 211. Thus, a first locking mechanism on a tray is configured to mate with a second locking mechanism on a tray platform. In one embodiment, there are two such locking mechanisms per tray/tray platform, such as one on either side of the tray and tray platform. In one embodiment, locking mechanism 213 is actuated by the ROV skid, such as by bumpers on the ROV. In another embodiment, the locking mechanism may be temporarily disengaged by the ROV skid once the ROV is docked with the subsea basket, which would then allow the trays to be removed or inserted as appropriate. The locking system may be needed to provide additional security for the trays being securely held within the basket when raising or lowering the basket through the water column.

Basket frame assembly 201 may have one or more receptacles 203 mounted to the front of the basket to interact with one or more stabs on the ROV skid. Receptacles 203 may comprise or be coupled to one or more hydraulic stab receptacles 205, each of which is configured to couple with and hydraulically receive power from an external device, such as ROV hot stabs or a set of surface deck hydraulic couplers. Each hydraulic supply stab powers elevator system 230 (such as a lead screw motor and/or a plurality of lead screws), thereby allowing the elevator system (and coupled tray platforms/seismic nodes) to move between a plurality of vertical positions. In one embodiment, the subsea basket comprises a quarter turn isolation valve (not shown) to select either deck or subsea mode for hydraulic power.

In one embodiment, subsea basket 200 may comprise one or more tray position indicators to verify and/or automatically align trays 221 and/or tray platforms 211 within the subsea basket. In one embodiment, subsea basket 200 is configured with a visual indicator (such as an arrow, letter, and/or number) on a fixed vertical member of the frame to align an active level of seismic nodes, such as the desired tray to be transferred, within the subsea basket. Thus, the seismic nodes/trays can be moved up or down and positioned relative to a single visual indicator/marker. In other words, a predetermined vertical position within the subsea basket may be set for transfer of a particular level of seismic nodes or tray to an external device (such as a ROV). During docking, the trays (or tray platforms) may be raised or lowered until the particular tray substantially aligns with the visual indicator. Similarly, if rails or another node holder are used instead of trays, the rails may be aligned to the desired visual indicator. Such a procedure may be performed automatically or manually. In one embodiment, the tray platform positions within the subsea basket are manually controlled by the ROV operator after the ROV has docked and/or engaged with the subsea basket.

While the elevator system and ability to move trays between different vertical positions in a subsea structure are generally described above in relation to a subsea basket, similar functionality and apparatuses may be used on an ROV skid to house and vertically move a plurality of trays within the ROV skid. This functionality would allow an ROV to carry more nodes at a single time and allow a single docking with a subsea basket to transfer a plurality of tray platforms. In still other embodiments, while the payload on the subsea structure 200 is generally a seismic payload in the form of autonomous seismic nodes, other seismic payloads (such as transponders, etc.) may be stored in the subsea basket, as well as non-seismic payloads.

Figure 3A:
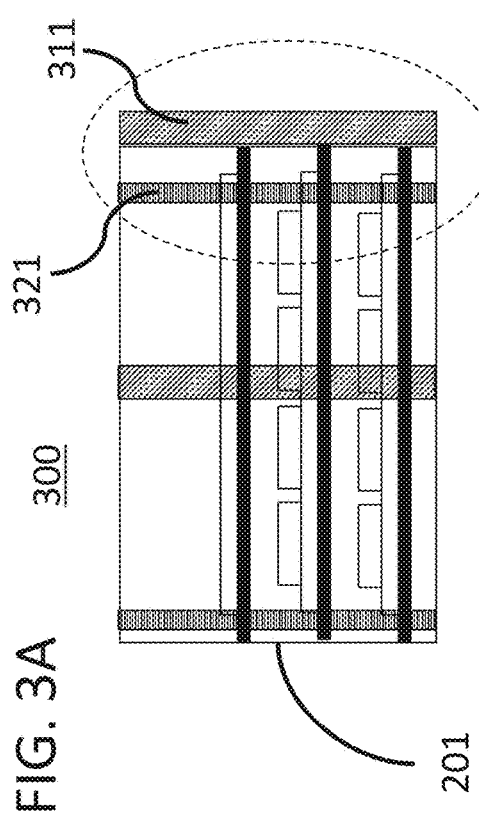
FIGS. 3A and 3B illustrate one embodiment of position indicators located on a subsea deployment basket.
Figure 3B:
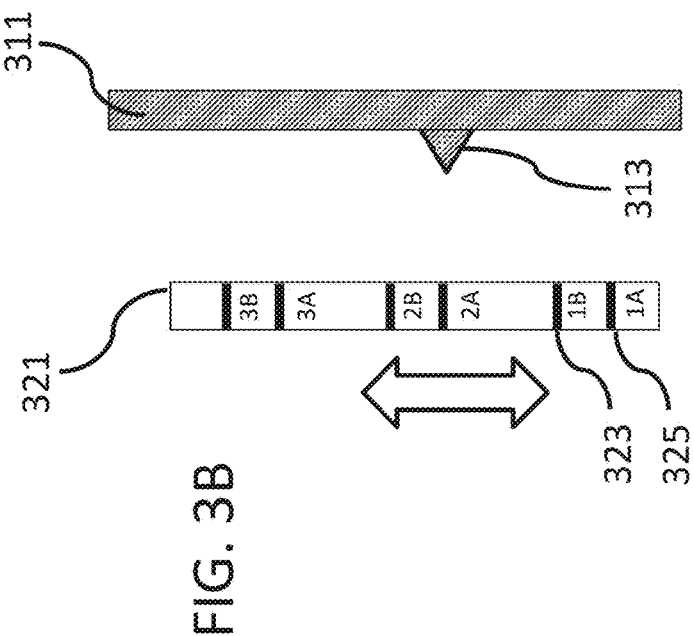

FIGS. 3A and 3B illustrate one embodiment of vertical positioning indicators on a subsea deployment basket. FIG. 3B is an enlarged portion of the circled portion from FIG. 3A.

FIG. 3A shows subsea basket 201 with various components not labeled for simplicity. In one embodiment, the subsea basket may have one or more vertical guides 321 that move up and down in conjunction with the elevator assembly and/or coupled trays. In one embodiment, each tray (or rail/node holder) is coupled to guide 321 and moves up or down as guide 321 moves. On one end of the basket frame may be located vertical rod 311. One or more markers may be located on both guide 321 and vertical rode 311 for positioning the elevator assembly with a particular point of the basket frame. In one embodiment, each tray platform or node holder within the basket may be marked with a position indicator, such as an arrow, letter, and/or number, that identifies the platform bay and identifies a particular vertical position of the tray platform. Further, a fixed plate on the subsea basket may have one or more basket indicators for alignment with the trays/tray platforms to a particular vertical position within the basket.

In one embodiment, as illustrated in FIG. 3B, a first tray platform, node holder, or rail (not shown) may be coupled to guide 321 proximate to first indicators 1B and 1A, a second tray platform (not shown) may be coupled proximate to second indicators 2B and 2A, and third tray platform (not shown) may be coupled proximate to first indicators 3B and 3A. For example, for the first tray, first position 1A may be identified by marker line 325 and second position 1B may be identified by marker line 323. Basket indicator 313 may be an arrow or similar marking device located on a fixed portion of the frame that is configured to allow an extending mechanism from the ROV to couple with the trays/tray platforms of the subsea basket, or vice versa. The tray and basket indicators may be used by the ROV operator (or automatically by the ROV) to align the desired level of seismic nodes or tray with a desired position of the basket to transfer the seismic nodes/tray between the ROV and the basket (such as by a stinger chain, as described below). Thus, an elevator assembly of the basket may be raised and/or lowered (with corresponding movement of guide 321) to a particular position of the basket (marked by arrow 313) for all transfers of seismic nodes and/or trays to and from the subsea basket. In one embodiment, each tray platform is marked by one or more visual indicators to facilitate vertical positioning within the subsea basket.

In one embodiment, if first tray indicator 325 (position A) is aligned with basket indicator 313, then the ROV transfer device (such as a stinger) may be safely extended into the basket. The tray and/or tray platform may be lowered until second tray indicator 323 (position B) is aligned with tray indicator 313, which indicates a position in which the tray and/or seismic nodes may be coupled to the stinger mechanism. In this position, the ROV stinger is ready to retract with the loaded tray. Other transfer mechanisms may similarly be utilized. In other words, a first indicator position (such as position A) indicates the ROV stinger (or similar extendable grabber or transfer mechanism) can be extended into and/or retracted from the subsea basket, and a second indicator position (such as position B) indicates the desired tray (or seismic nodes) can be transferred between the subsea basket and ROV. In other operations, the use of positional indicators can be controlled by an automatic process that does not require ROV operator involvement. This automatic process may be based on encoder technology connected to the lead screws which would provide an accurate estimate of the elevator vertical position. In this alternative, a visual indicator may be provided as a safety precaution so that an operator can see that the automated functionality is working correctly.

In one embodiment, each tray platform is equipped with a mechanical auto-stop valve that is connected to a hydraulic line on the elevator assembly motor (such as a lead screw motor). Should the operator overshoot the desired position of the tray (such as when moving between position A and B), the auto-stop valve cuts the hydraulic supply to the motor to avoiding any damage to the stinger assembly. Supply to the "down" function may be restored when the elevator is raised and the auto stop valve is un-actuated. In another embodiment, the subsea basket incorporates an acoustic modem and/or inclinometer (coupled to a battery pack) to ensure the heading of the basket can be monitored by the ROV and/or a surface vessel ROV during docking operations.

Figure 3C:
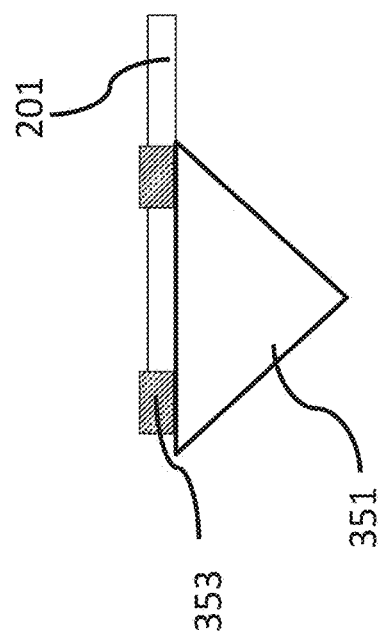
FIG. 3C illustrates one embodiment of a stabilizing device on a subsea deployment basket.

FIG. 3C illustrates one embodiment of a stabilizing device on a subsea deployment basket. In one embodiment, a stabilizing device 351 is coupled to both of the forward corners of basket frame 201. Thus, two stabilizing devices may be used for a basket. In one embodiment, the stabilizing device is substantially in the shape of a triangle, although many different shapes and combinations of stabilizing devices are possible. For example, a single stabilizing device (such as in the center of the subsea basket) may be used, or two or more devices can be used at different portions of the subsea basket. In one embodiment, the stabilizing devices are generally arranged to provide a symmetrical stabilizing force around the basket lifting point, which would act as the center of rotation. The surface vessel may be moving or stationary relative to the seabed, and in either case current or tidal flow may be moving to provide the required hydrodynamic stabilizing force for the subsea basket. In one embodiment, each stabilizing device has sufficient area (either alone or in combination with other stabilizing devices) to create a stabilizing force to align the basket into the flow of water while travelling subsea. In one embodiment, each stabilizing device may be folded up or retracted (such as by hinges 353) before landing the basket on the back deck of a surface vessel and extended after being deployed from the back deck. The stabilizing devices may be automatically retracted and/or manually retracted. For example, one or more hydraulic cylinders may be coupled to each stabilizing device for automatic movement of the device. Further, electric or hydraulic actuators may be used to deploy the stabilizing device(s), which may be triggered by an acoustic signal from the surface vessel or ROV. Alternatively, the stabilizing devices can be deployed prior to over boarding of the basket.

Figure 4A:
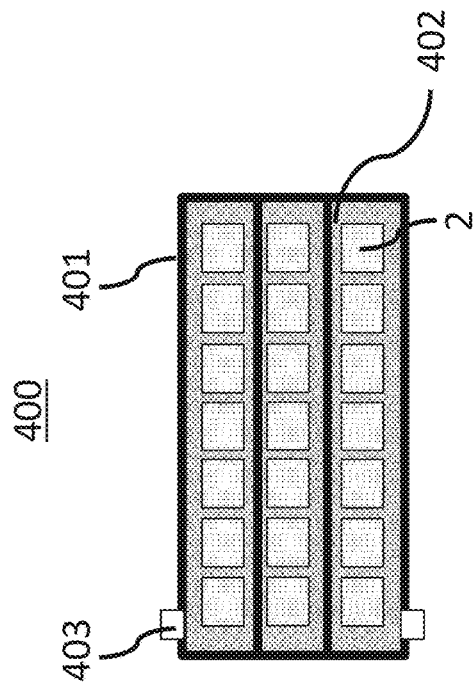
FIGS. 4A and 4B illustrate one embodiment of a node holder (e.g., a tray) that may be used with a subsea deployment basket of the present disclosure.
Figure 4B:
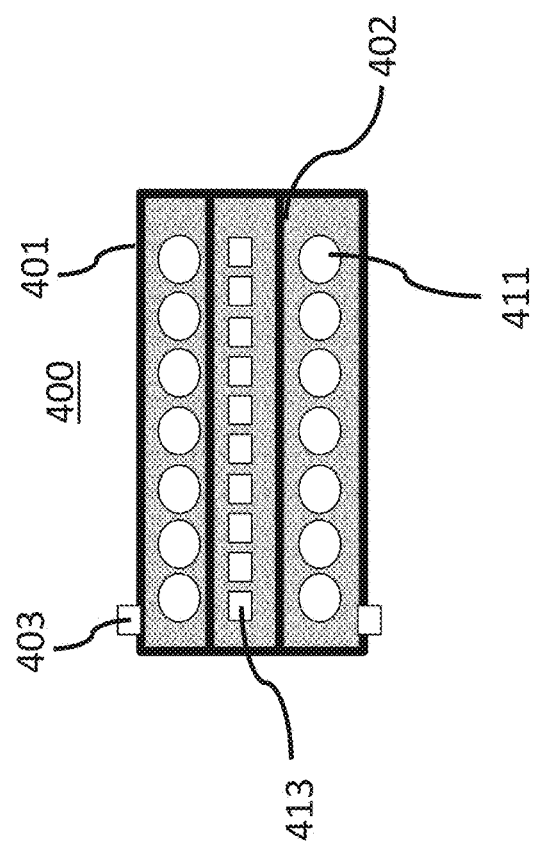

FIGS. 4A-4B illustrate one embodiment of a node holder that may be used with a subsea deployment basket of the present disclosure. In one embodiment, node holder 400 may be a tray that is substantially similar to tray 211 described herein. FIG. 4A shows the node holder loaded with seismic nodes 2, while FIG. 4B shows an empty tray without any seismic nodes. Of course, a tray is not necessarily used for the elevator assembly as disclosed herein, and the seismic nodes may simply be located on one or more horizontal support members within the frame that are each coupled to the elevator assembly.

Each tray 400 may have a substantially rectangular shape that holds a plurality of autonomous seismic nodes (or other payload devices) on the tray. Other shapes or configurations of node holder 400 are possible. In one embodiment, each tray may hold a plurality of seismic nodes, such as three rows with seven nodes within each row for a total of approximately 21 nodes. In one embodiment, to reduce tray weight and decrease drag in the water, a plurality of openings 411 (see FIG. 4B) may be located in the tray that allow the tray to still hold the seismic nodes without allowing them to fall through the tray. Tray 400 may have an upper lip 401 around the perimeter of the tray to prevent the nodes from sliding off the tray, and one or more inner lips 402 for delineating (and preventing sliding of) the different sections of nodes within the tray. A section of the tray, such as the middle row, may have a plurality of openings 413 to interface with a drive mechanism to move the tray from a first horizontal position to a second horizontal position (whether on the ROV or subsea basket), such as a forward and reverse position to allow the seismic nodes to be more easily loaded/unloaded from the tray or to allow the tray to move from a tray platform. The tray may have one or more locking mechanisms 403 to lock the tray within the subsea basket or ROV skid. In one embodiment, tray locking mechanism 403 is configured to couple with tray platform locking mechanism 213.

ROV Skid

As mentioned above, the deployment basket described herein carries a plurality of seismic nodes from a surface vessel to a subsea position for transfer with an underwater vehicle, such as a ROV. While various underwater devices and structures may transfer the seismic nodes from the described subsea basket, FIGS. 5A-5D illustrates one embodiment of an ROV (or ROV skid) that may be coupled to the deployment basket described herein. While a tray is illustrated as the node holder in this embodiment, other node holders may similarly be used.

Figure 5A:
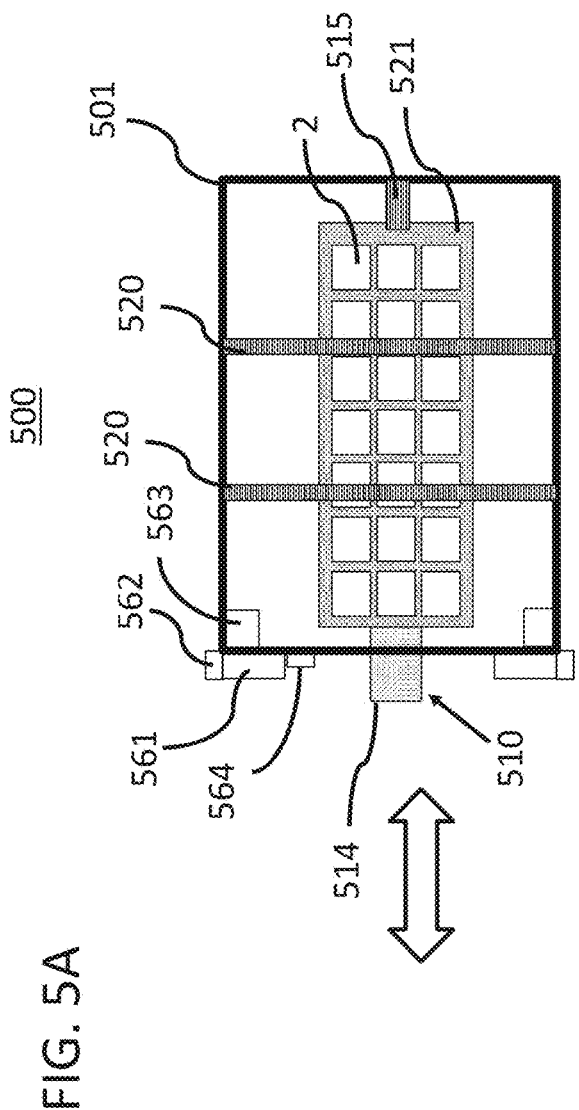
FIGS. 5A-5D illustrate various embodiments of a ROV skid, from a top perspective, that may be coupled to a deployment basket of the present disclosure.
Figure 5B:
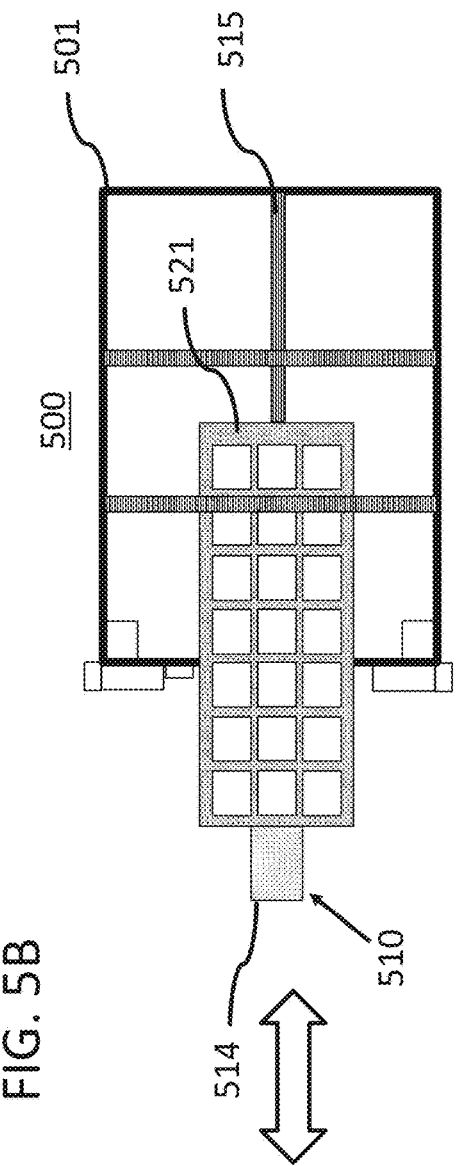
Figure 5C:
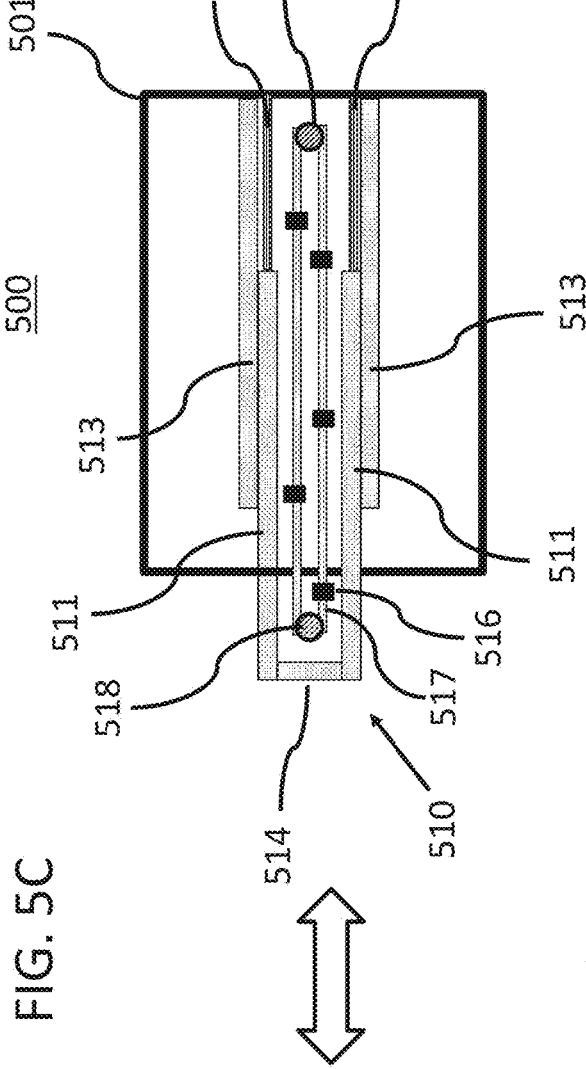
Figure 5D:
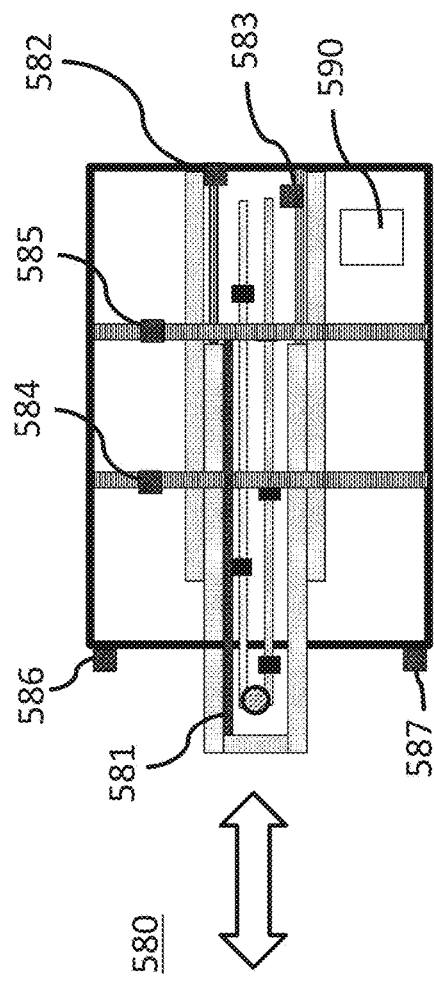

FIGS. 5A-5D illustrate various embodiments of a ROV skid that may be coupled to a deployment basket of the present disclosure from a top perspective. FIG. 5A shows a top perspective of the skid with a loaded tray substantially within the skid, while FIG. 5B shows the loaded tray partially extended from the skid. Various components of the skid labeled in FIG. 5A are not labelled in FIG. 5B for simplicity and clarity. FIG. 5C shows a top perspective of the skid transfer mechanism in a partially extended position without a tray coupled to the transfer mechanism, while FIG. 5D shows a sensor system of the skid transfer mechanism in relation to the components illustrated in FIG. 5C (which are not numbered for simplicity).

ROV skid 500 may be substantially similar to ROV skid 115. In one embodiment, a single tray from the subsea deployment basket is transferred to and held within the ROV skid, while in other embodiments the ROV skid is configured to hold a plurality of trays at different heights within the skid, in other embodiments the ROV skid is configured with an elevator assembly such that a plurality of trays may be moved vertically within the ROV skid (similar to the elevator assembly within the subsea deployment basket), and in still other embodiments the ROV may be coupled to an elevator assembly that moves the ROV in relation to the subsea deployment basket to transfer different trays at different vertical heights from the ROV skid to the deployment basket.

As illustrated in FIG. 5A, in one embodiment, ROV skid 500 may comprise transfer mechanism 510 that extends and retracts from the skid with the aid of one or more hydraulic cylinders 515. Skid transfer mechanism 510 may be located centrally within frame 501 the skid and may be considered a stinger mechanism. Transfer mechanism 510 may be extended to align with a loaded tray in the deployment basket and to engage the loaded tray for transfer back to the ROV (or vice versa). Transfer mechanism 510 may comprise an extendable stinger tray 514 located at one end of the stinger mechanism. Transfer mechanism 510 is configured to extend and retract within and in relation to the ROV such that a subsea payload can be transferred to and from the ROV. As illustrated in FIG. 5A, tray 521 may be loaded with a plurality of seismic nodes 2 and be coupled to transfer mechanism 510, such as by sitting on top of the transfer mechanism. Tray 521 may be substantially similar to tray 400. Transfer mechanism 510 may be extended from the ROV with the coupled tray, thereby causing the tray to move relative to the ROV. In one embodiment, the stinger tray 514 may move in addition to and relative to stinger mechanism 514. In other embodiments, the stinger mechanism may comprise a chain drive (see FIGS. 5C and 5D) that is configured to move the tray 521 relative to stinger mechanism 510 and/or the ROV even if the stinger mechanism remains in a substantially fixed position.

In one embodiment, two sets of hydraulically actuated retractable flapper mechanisms 520 work in unison with stinger mechanism 510 to move nodes 2 within tray 521. For example, flappers 520 may be configured to move the nodes relative to the front of ROV skid 500 to ensure a row of nodes are always available to deploy at any given point. Flappers 520 also allow the nodes to be positioned at the rear of the tray as the nodes are collected from the seabed. These steps may be automated on an ROV control system but can be overridden by the operator. Flappers 520 may be fully retractable within the upper section of the ROV skid frame and actuated as required.

In one embodiment, the front of ROV skid 500 may include two off-profiled docking bumpers 561 with integrated docking wings 562 (only one side of the ROV is numbered for convenience). Docking wings 562 may be hydraulically actuated by spring return failsafe hydraulic cylinders. Once aligned with the deployment basket (such as docking receptacles 203), wings 562 may be extended to pull the ROV skid in securely and align stinger mechanism 510 with the basket tray loading mechanism of the subsea basket. Other docking mechanisms may be utilized. An inner face of bumper 561 may also temporarily unlock soft locking mechanism components 213 (FIG. 2B) and/or 403 (FIG. 4) on the basket, which keeps the trays in position during deployment. In other embodiments, a portion of the stinger mechanism or another portion of the ROV skid interfaces with the subsea basket to unlock the trays from the subsea basket.

In one embodiment, ROV skid 500 may comprise a set of hydraulic stabs/couplers 563 at the front of the skid, which are able to power and control various mechanisms on the subsea deployment basket after being docked, such as elevator mechanism 230. ROV skid 500 may also comprise inspection camera 564 at the front of the skid to allow for visual alignment of the desired trays within the subsea deployment basket. In one embodiment, data from inspection camera 564 is fed back through a control system on the ROV and/or skid. Camera 564 allows the ROV operator to drive the subsea basket elevator system and visually align the desired tray with the opening in the basket during tray collection and return.

As illustrated in FIG. 5B, a loaded tray 521 is partially extended from the skid. This position may be during deployment of the seismic nodes onto the seabed or during transfer of the seismic nodes (and tray) to or from a subsea basket. In one embodiment, hydraulic cylinder 515 is moved between an extended and/or retracted position to move transfer mechanism 510 between a substantially retracted position (FIG. 5A) and a partially or substantially extended position (FIG. 5B).

As illustrated in FIG. 5C, transfer mechanism 510 may comprise a chain drive that is configured to move tray 521 relative to stinger mechanism 510 and/or the ROV. The chain drive may include chain 517 coupled to one or more chain drive mechanisms 518. In the embodiment shown in FIG. 5C, the chain drive has two chain drive mechanisms (e.g., gears or sprockets) located on opposite sides of transfer mechanism 510, one of which may be coupled to a chain drive motor 519. A plurality of spring loaded capture dogs 516 may be coupled to the chain mechanism, such as being located on various portions of chain 517. The capture dogs may be coupled and/or mounted to the chain drive in a manner that moves the dogs in relation to the skid. Once aligned, the chain drive allows a node holder from a subsea basket (such as loaded tray 221) to be transferred to and stored within ROV skid 500. In one embodiment, capture dogs 516 engage and/or couple with profiled slots or openings 413 on the underside of tray 400 (see FIG. 4B) to move the tray in relation to the skid and/or stinger mechanism. Capture dogs 516 may be spring loaded to allow for slight misalignment between the dogs and the profiled slots on the tray underside. Each dog 516 may comprise or be coupled to a magnet or other identification marker for control sensing purposes. Other arrangements/configurations of the dogs and corresponding openings on the tray are possible. In one embodiment, as stinger chain mechanism 518 actuates, dogs 516 spring into the next available slot within tray 400 until fully engaged. In one embodiment, proximity sensors (see FIG. 5D) at the rear of the chain drive allow the tray to stop at a pre-determined position when being pulled into the ROV skid. Chain drive mechanism 518 may be driven by hydraulic motor 519 at the rear of the stinger chain assembly. In one embodiment, transfer mechanism 510 may comprise a plurality of fixed and/or moveable horizontal support members, such as fixed members 513 and moveable members 511. In one embodiment, hydraulic cylinder 515 are coupled to each of the moveable members 511 and extend/retract those members with actuation of the hydraulic cylinder. In one embodiment, the tray sits directly on portions of the horizontal members 511, 513.

FIG. 5D illustrates one embodiment of sensor system 580 located within ROV skid 500 to monitor various positions of the components within ROV skid 500. FIG. 5D is similar to FIG. 5C, but illustrates the sensor components as opposed to the mechanical components within the skid. Sensor system 580 may be coupled to or be part of control system 590 of the ROV skid. Control system 590 may comprise an on board electro-hydraulic control system with multiple proportional and solenoid valves to allow complete control of the various hydraulic functions within the skid. In one embodiment, sensor 581 may be a linear displacement sensor (such as a LVDT sensor) and run the length of the stinger tray mechanism 510 to give feedback as to the exact position of the tray at any given moment. In one embodiment, the exact tray position is determined by "zero-ing" the position of the tray inside the skid against the end stops of the tray. Once zeroed, magnets in capture dogs 516 allow the position sensors to measure the travel of the stinger chain and therefore the tray relative to the end stops. The ROV skid may also comprise one or more tray end stop proximity sensors 582 to confirm when the tray is fully retracted onto the chain drive mechanism. Sensors 582 also allow the zeroing of LVDT sensor 581 movement measurements. The ROV skid may also comprise a plurality of stinger position proximity sensors 583 to confirm when stinger extension 510 is fully extended or fully retracted. The ROV skid may also comprise a plurality of flapper proximity sensors, such as front flapper sensor 584 and rear flapper sensor 585, to confirm the positions of flappers 520 and/or confirm when the flappers are deployed. The ROV skid may also comprise one or more proximity sensors 586 to confirm that the ROV skid is fully "home" relative to the basket during engagement and/or otherwise provide the relative position between the ROV and the subsea basket during close proximity situations. The ROV skid may also comprise one or more docking proximity sensors 587 to confirm that any docking interface actuators are fully extended into the subsea deployment basket and that the ROV is fully "locked" with the subsea deployment basket. One of skill in the art will realize that more or less sensors are possible, depending on the particular docking and/or transfer components utilized by the ROV.

Figure 6A:
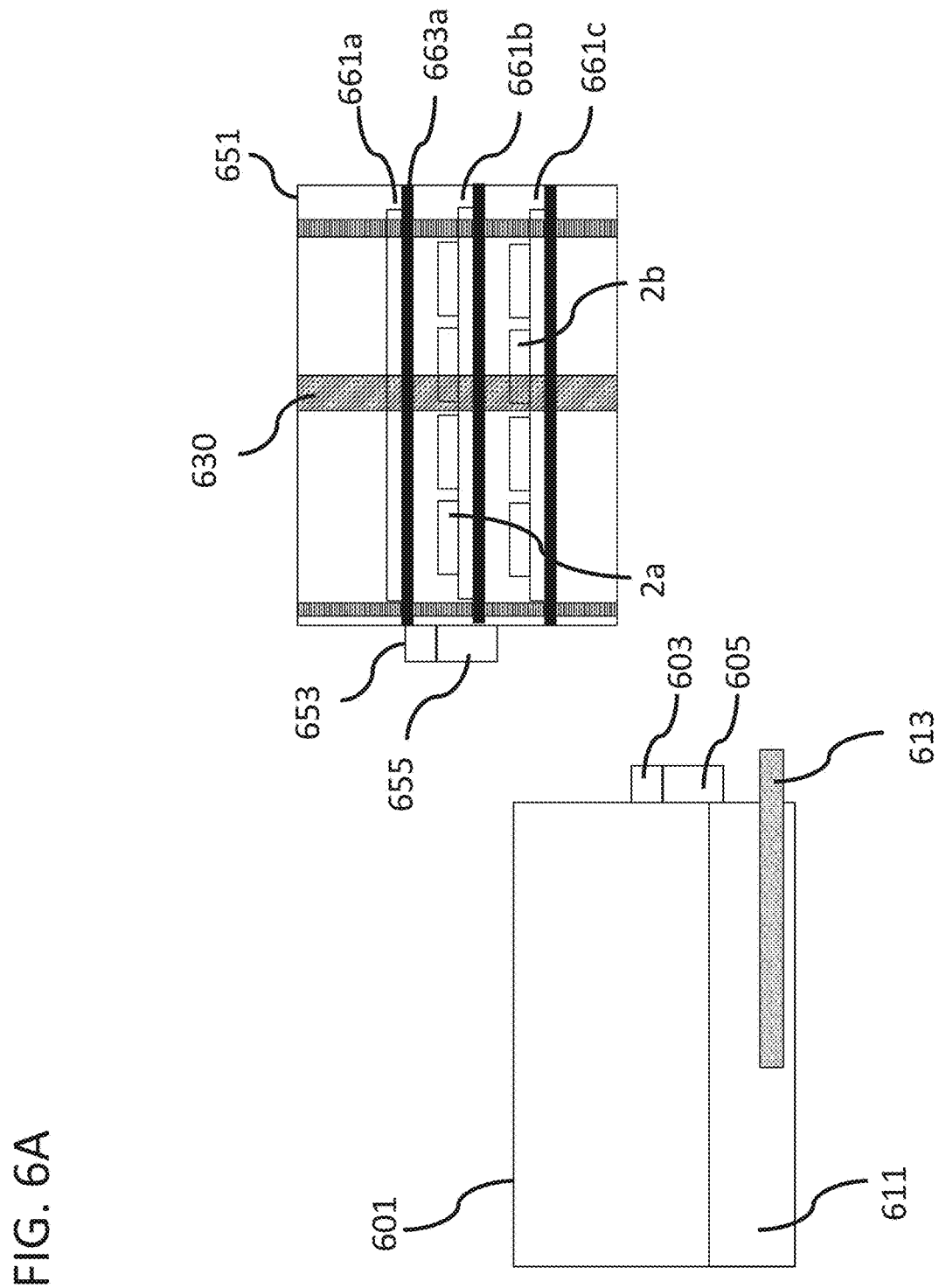
FIGS. 6A-6E illustrate various positions of a ROV and subsea basket during transfer of seismic nodes according to one embodiment of the present disclosure.

FIGS. 6A-6E illustrate various positions of a ROV and subsea basket during transfer of seismic nodes according to one embodiment of the present disclosure. FIG. 6A illustrates ROV 601 adjacent to subsea basket 651 (prior to or after docking). ROV 601 may comprise ROV skid 611 and transfer mechanism 613. The ROV may also have hydraulic hot stabs 603 and docking probe(s) 605. In one embodiment, ROV 601 is substantially similar to the ROVs and/or ROV skids detailed previously. As illustrated, transfer mechanism 613 is able to extend and retract from ROV skid 611 depending on the desired operation, and in one embodiment may be substantially similar to stinger mechanism 510. Subsea basket 651 may be substantially similar to the prior baskets detailed herein, such as basket 200. Subsea basket 651 may comprise elevator system 630, which may comprise one or more vertical actuators (e.g., lead screws or hydraulic cylinders) and one or more vertical guides. For coupling with the ROV, the subsea basket may have a docking receptacle 655 and a hot stab receptacle 653. The particular docking/coupling devices may comprise any number of such devices and the present disclosure is not dependent on the particular docking and/or coupling devices utilized. In one embodiment, subsea basket 651 may have three trays and/or tray platforms located at different heights within the subsea basket and vertically moveable within the subsea basket based on operation of elevator assembly 630. In other operations, trays are not utilized and the seismic nodes may sit on other node holders or simply one or more horizontal support rails or slides. For example, tray 661a may be located on first tray platform 663a, a second tray may be located on a second tray platform, and a third tray may be located on a third tray platform. In FIG. 6A, the first tray is empty (e.g., it has no seismic nodes) and the second and third trays are loaded with seismic nodes 2a and 2b, respectively.

FIGS. 6B-6E illustrate various transfer positions of a docked ROV and subsea basket according to one embodiment of the present disclosure. For simplicity purposes, only ROV skid 611 (with stinger transfer mechanism 613) is shown in these figures. The docking receptacles and other coupling devices are similarly not shown in FIGS. 6B-6E.

Figure 6B:
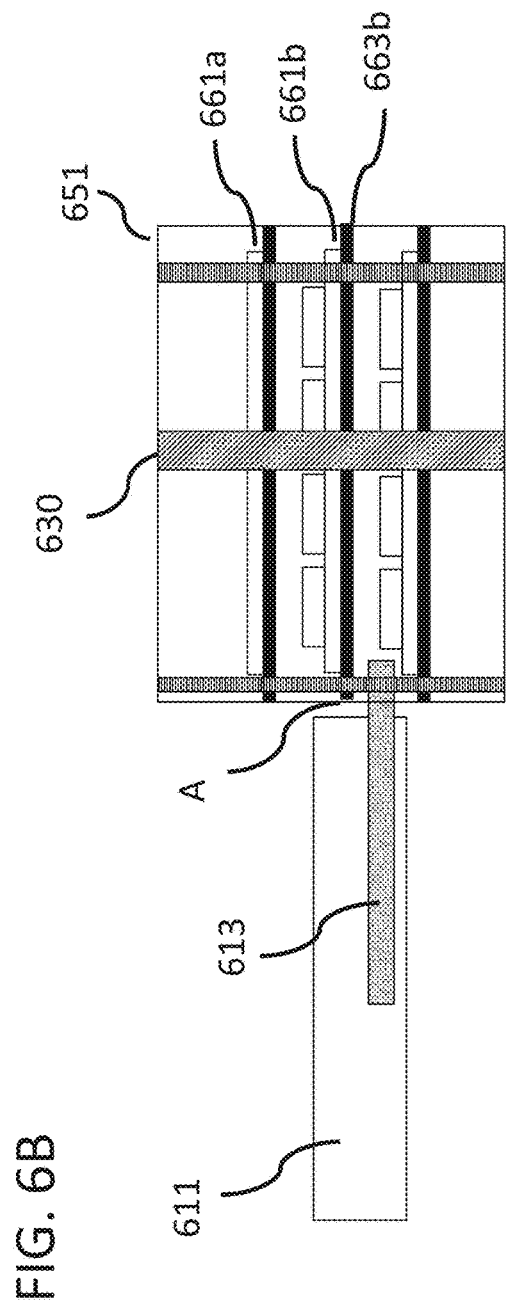

FIG. 6B illustrates a position after docking between subsea basket 651 and ROV 601. Tray 661b has been moved (either raised or lowered) to the desired vertical height within the basket, which is marked as Position A. In one embodiment, Position A is the position that it is safe for transfer mechanism 613 to be extended into basket 651. In one embodiment, transfer mechanism 613 is positioned beneath tray 661b and tray platform 663b. In one embodiment, empty tray 661a may have already been loaded back into the subsea basket during the same docking procedure/position. In such a situation, empty tray 661a would first be transferred to the subsea basket (after tray platform 663a had been lowered to the desired position) and in the same docking procedure, the tray platforms vertically moved until the desired tray 661b is in the correct position for transfer (such as position A as illustrated). FIG. 6B shows transfer mechanism 613 partially extended into the basket.

Figure 6C:
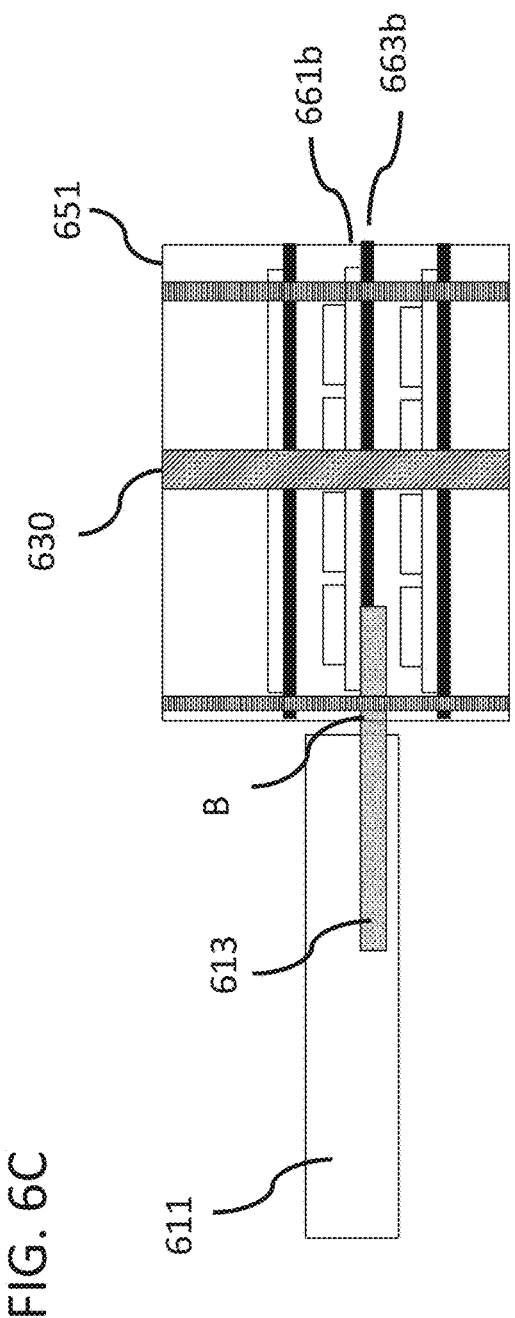

FIG. 6C illustrates a subsequent position with a more fully extended stinger mechanism and a lowered tray. For example, once stinger mechanism 613 has been extended a desired distance within the basket, the desired tray may be vertically moved (e.g., lowered) to Position B, which is a position that substantially couples the tray to the transfer mechanism. In other embodiments, this position may be the position at which the seismic nodes are directly coupled to a transfer mechanism of the ROV skid. For example, tray 661b may be lowered until it reaches position B and/or touches transfer mechanism 613. At this point, tray 661b is ready to be transferred onto transfer mechanism 613 and/or within ROV skid 611. In other embodiments, the seismic nodes are directly coupled to a transfer mechanism (without the use of a tray or node holder) and transferred to the ROV.

Figure 6D:
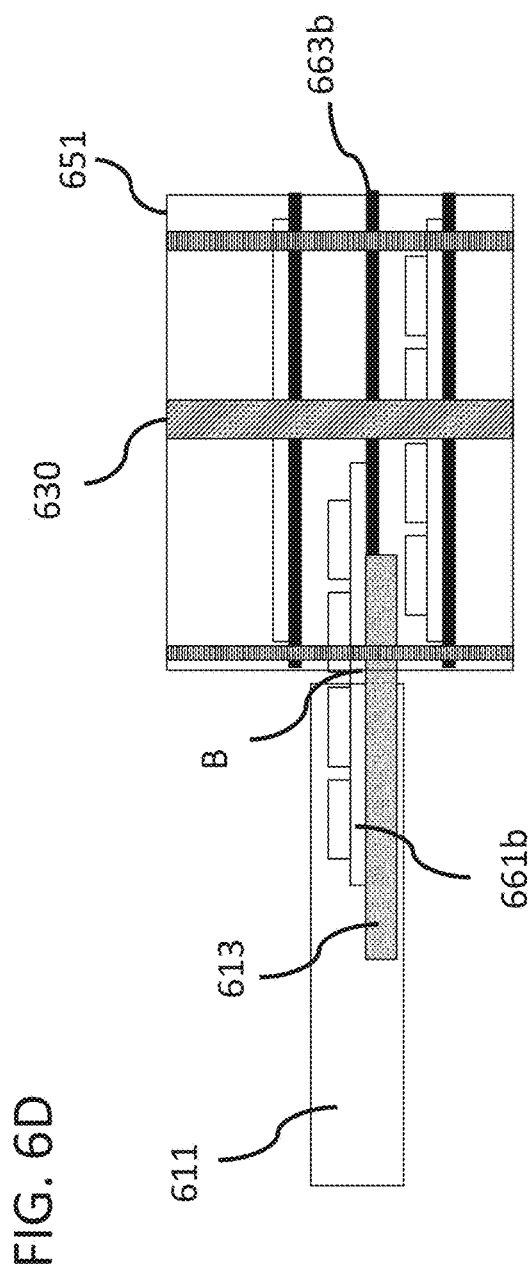

FIG. 6D illustrates a subsequent position showing a tray being transferred onto the stinger mechanism from the subsea basket after the tray has been lowered to Position B. For example, stinger mechanism 613 may couple to a portion of tray 661b and by retracting the stinger mechanism within the ROV skid and/or engaging a chain mechanism on the extended stinger mechanism after coupling the tray to the stinger mechanism, the stinger mechanism may horizontally move tray 661b towards and within the ROV skid and away from the subsea basket. In one embodiment, tray platform 663b remains substantially in place within the subsea basket while tray 661b is transferred.

Figure 6E:
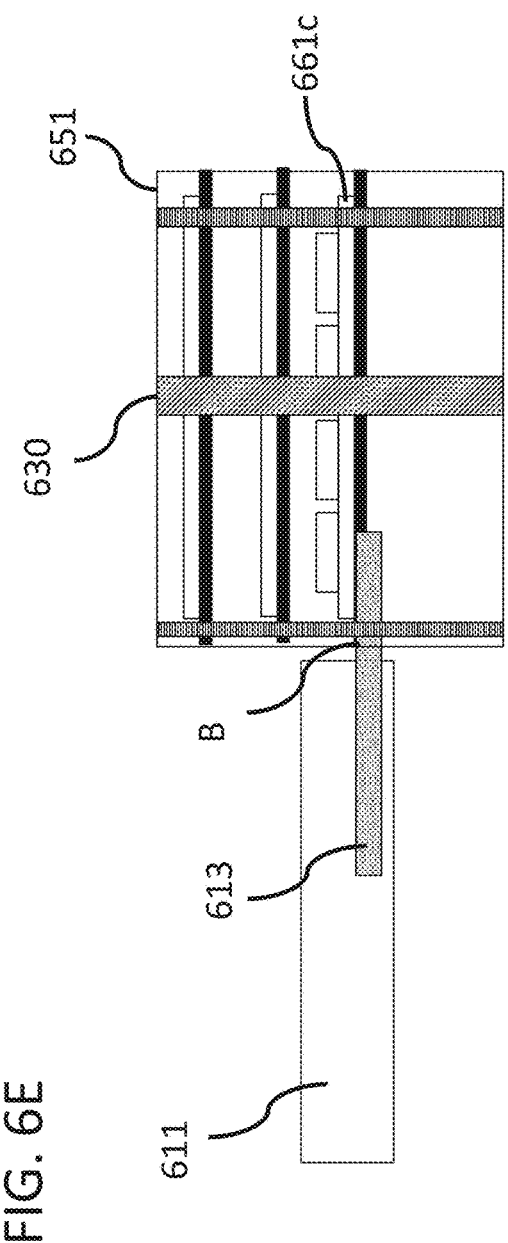

FIG. 6E illustrates another transfer position of the subsea basket and stinger mechanism. The positions illustrated in FIG. 6E may be substantially similar to the positions illustrated in FIG. 6C but for a transferring a different tray, such as tray 661c. For example, FIG. 6C shows stinger mechanism 613 coupled to second tray 661b, while FIG. 6E shows stinger mechanism 613 coupled to third tray 661c. While the vertical positions of the trays (or different levels of seismic nodes) in the subsea basket have been moved between FIGS. 6C and 6E, the docking and/or transfer position between the subsea basket and ROV remains the same. In one embodiment, FIG. 6E shows a position after which the ROV has deployed all of the nodes from tray 661b (see FIG. 6D), has re-docked with the subsea basket, and has returned the empty tray 661b onto the subsea basket.

Figure 7:
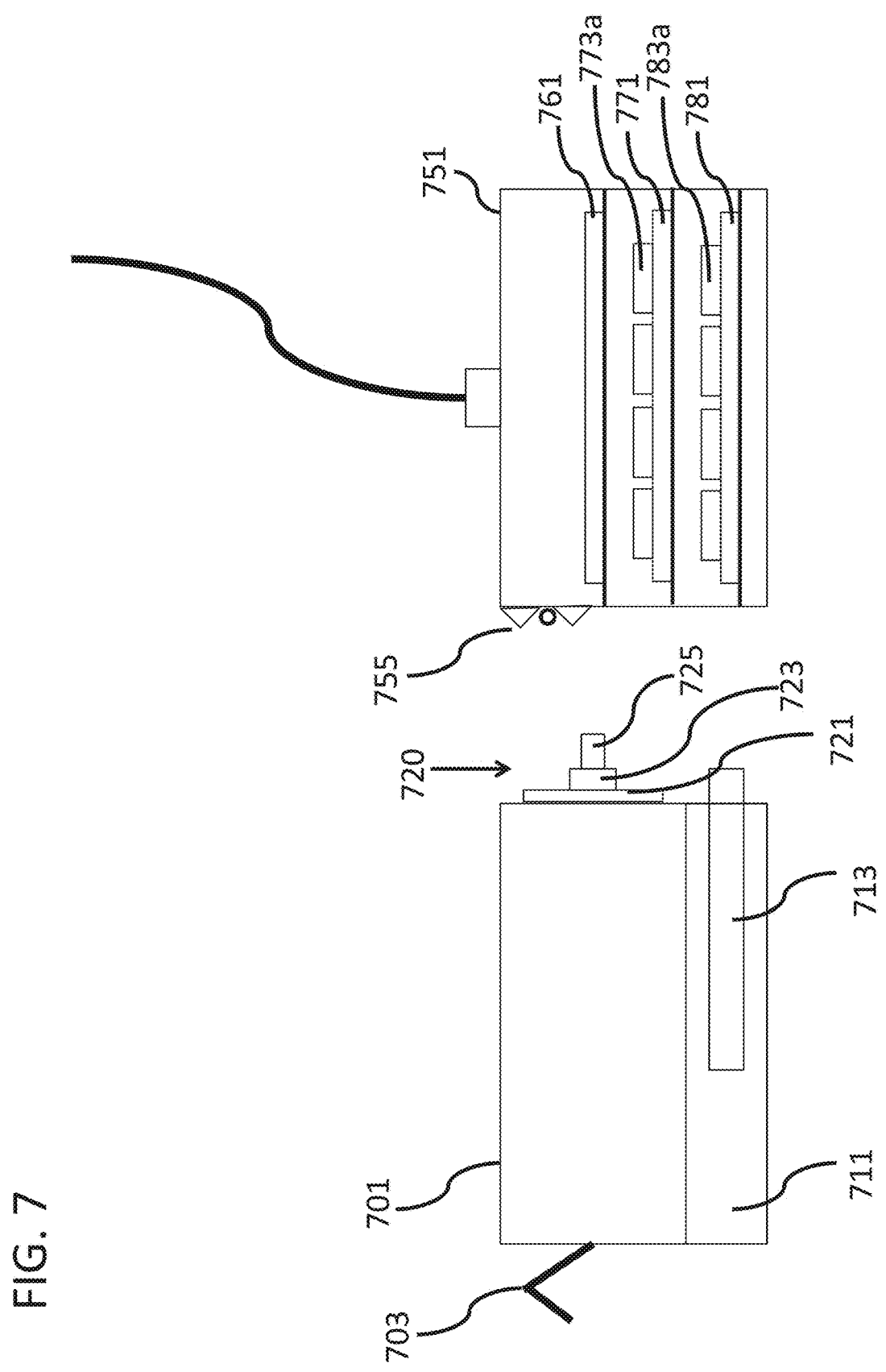
FIG. 7 illustrates one embodiment of a ROV elevator mechanism to be coupled with a subsea deployment basket.

FIG. 7 illustrates one embodiment of an elevator mechanism coupled to an ROV. In one embodiment, the ROV may be the FUGRO FCV3000, but other similar ROVs can be used as well. In this embodiment, the elevator mechanism allows the relative ROV position to be vertically moved (after docking) in relation to the subsea deployment basket to transfer different trays/nodes at different heights in the subsea deployment basket. In one embodiment, deployment basket 751 may have a plurality of node holders or trays 761, 771, 781, each of which may be loaded with a plurality of nodes. More or less node holders are possible. In one embodiment, first tray 761 has no nodes, while second tray 771 is loaded with a first plurality of nodes 773a and third tray 781 is loaded with a second plurality of nodes 783a. In one embodiment, each node holder is located at a fixed (but separate) vertical height within the deployment basket, such as on a plurality of fixed levels, racks, or tray platforms within the deployment basket, each which may be configured to hold a tray. Deployment basket 751 may be lowered from a surface vessel to a subsea position for docking with a subsea structure, such as ROV 701 or other underwater vehicle. Deployment basket 751 has docking system 755 to couple the ROV with the deployment basket, which may be any number of known docking systems for ROVs and subsea baskets. While seismic nodes are utilized in this example as the seismic payload, other devices (both seismic and non-seismic) may be transferred on the deployment basket (and located at different heights in the basket) and transferred to an underwater vehicle or similar structure.

As is known in the art, ROV 701 may have ROV skid 711 coupled to the ROV at the bottom portion of the ROV, such as ROV skid 115. In one embodiment, ROV skid 711 is substantially similar to ROV skid 500 (see FIG. 5A). The ROV skid may have a retractable stinger mechanism 713 that can slide in and out of the ROV skid to couple with a portion of the deployment basket and/or transfer a device between the ROV skid and the deployment basket (such as a tray or seismic node), similar to stinger mechanism 510. In one embodiment, stinger mechanism 713 is configured to couple with a tray from the deployment basket and transfer the tray from the deployment basket to the ROV. Similarly, stinger mechanism 713 can transfer trays from the ROV skid to the deployment basket in a similar way as is done in relation to FIGS. 6A-6E.

As opposed to prior embodiments which included an elevator mechanism on the subsea basket, the embodiment in FIG. 7 illustrates an elevator mechanism coupled to the ROV, which may be located on the front or end portion of the ROV. FIG. 7 shows elevator mechanism 720 on the rear portion of the ROV, with the ROV manipulator arm 703 on the front portion of the ROV. Elevator mechanism 720 may be configured to both couple the ROV to the deployment basket and to vertically move the ROV in relation to the deployment basket. In one embodiment, elevator mechanism 720 comprises frame 721, moving member 723, and coupler 725. Frame 721 may be rigidly coupled to the ROV and may comprise one or more vertical bars or guides on the side of the ROV. Moving member 723 may be coupled to frame 721 and may comprise one or more horizontal bars and is configured to vertically move up and down frame 721. Coupler 725 is configured to couple and/or engage with one or more positions on the deployment basket. In one embodiment, frame 721 comprises two vertical guides or members on opposite sides of the rear portion of the ROV and moving member 723 comprises a bar mounted to the vertical guides and moves up and down the vertical guides by any number of mechanisms, such as one or more hydraulic cylinders or a rack and pinion gear system or lead screws.

In one embodiment, coupler 725 may be any docking apparatus known to those of skill in the art, such as one or more harpoons or guide members that can engage and/or lock around one or more portions of the deployment basket. In one embodiment, coupler 725 is configured to couple with docking system 755 on the deployment basket. In one embodiment, coupler 725 comprises two harpoons or cylinders that extend out from opposite sides of moving member 723 that engage with a horizontal bar of docking system 755. In one embodiment, coupler and/or docking system 755 is configured to move the ROV and deployment basket closer and further away from each other by known techniques.

Once the ROV is fully docked to the deployment basket, elevator mechanism 720 may be actuated to move up or down, which moves the ROV vertically up or down in relation to the deployment basket. In one embodiment, each node holder (such as tray 761, 771, 781) is located at different fixed vertical heights in the deployment basket. The elevator mechanism (either automatically or manually) is vertically moved such that the stinger mechanism 713 is positioned at the correct height to move the tray from the deployment basket to the ROV skid (or vice versa). A tray (with loaded seismic nodes) can be moved one at a time from the deployment basket to the ROV, and the seismic nodes can then be deployed from the ROV to the seabed as described herein. When the tray is fully unloaded, the ROV may dock with the deployment basket and have the elevator mechanism move to a first vertical position such that the stinger mechanism is aligned with a first level of the deployment basket to transfer the empty tray, and then move to a second vertical position to align the stinger mechanism with a second level of the deployment basket to transfer another tray (loaded with seismic nodes) to the ROV. Such an elevator mechanism allows a single docking operation between the ROV and the deployment basket and the ability to transfer a plurality of trays back and forth between the ROV and deployment basket (at different vertical heights) without having to re-dock multiple times.

Of course, variations of the ROV design and operation in relation to FIG. 7 are possible. For example, the elevator mechanism can be located on the front or rear end of the ROV, and the nodes can be deployed from either the front or rear end of the ROV (with or without a manipulator arm).

Operation

Figure 8:
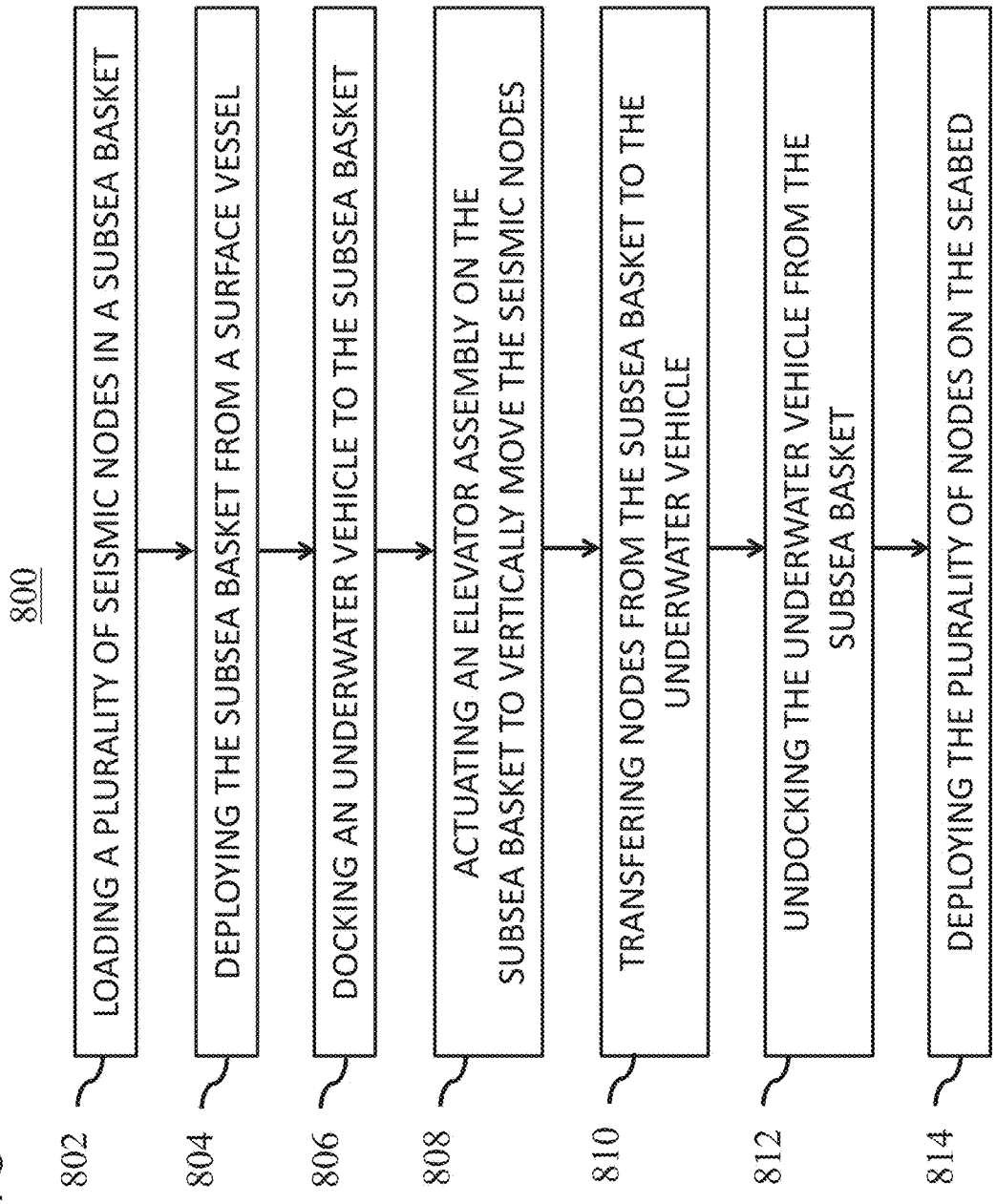
FIG. 8 illustrates one embodiment of a method of deploying a plurality of seismic nodes from a surface vessel to the seabed by using a deployment basket and an ROV.

FIG. 8 illustrates one embodiment of various subsea operations of the deployment basket. In particular, FIG. 8 illustrates method 800 of deploying a plurality of autonomous seismic nodes from a surface vessel to the seabed by using a deployment basket and a ROV.

Step 802 comprises loading a plurality of payload devices on a subsea deployment basket on a surface vessel. The payload devices may be a plurality of autonomous seismic nodes, each of which is located on a tray and/or tray platform or fixed/sliding rails within the basket. Thus, a plurality of trays (such as three) may be loaded onto the node basket. Other subsea structures besides a basket also may be used, such as a skid or similar holding device. As appropriate, an elevator mechanism on the node basket is moved vertically until the desired level or tray platform is aligned for insertion of the trays/seismic nodes. Alternatively, if the elevator mechanism is located on the ROV assembly, then the tray platforms may each be located on a fixed level within the node deployment basket. Each tray is preloaded with a plurality of autonomous seismic nodes, such as 21 nodes (3 rows of 7 nodes each). Besides autonomous seismic nodes, other seismic payloads or non-seismic payloads may be loaded in addition to or in lieu of the seismic nodes. Step 804 may comprise deploying the node basket from the surface vessel to a first subsea position by a heave compensated crane line. One or more underwater vehicles (such as an ROV) may be deployed from the surface vessel by a LARS system. Step 806 may comprise docking the ROV to the underwater basket. The docking wings of the ROV skid may extend to lock the skid in position with the deployment basket. In one embodiment, hydraulics couplers of the ROV engage with receptacles on the basket. ROV sensors may be used to confirm correct alignment and engagement of the ROV skid to the node deployment basket.

Step 808 may comprise actuating an elevator assembly to move some or all of the seismic nodes within the subsea basket to different vertical positions. The elevator assembly may be located on the ROV or the subsea basket. In one embodiment, an elevator assembly on the subsea basket moves a plurality of nodes between a plurality of vertical positions. This step may comprise operating the elevator assembly within the deployment basket to align the desired tray into the appropriate vertical position within the basket to be aligned with a stinger mechanism from the ROV. This allows the stinger mechanism on the ROV skid to be safely extended into the deployment basket to engage the tray and/or seismic nodes. In one embodiment, an ROV operator manually aligns the desired tray to a first position on the basket. The step may also comprise moving the plurality of nodes from a first vertical position to a second vertical position within the node basket. In one embodiment, once the stinger mechanism is extended into the deployment basket, the ROV operator lowers the elevator mechanism to a second position. Other embodiments allow for automatic positioning/alignment of the trays. Alternatively, if the elevator mechanism is located on the ROV assembly, then the elevator mechanism is moved up or down until the stinger mechanism on the ROV is aligned with one of the trays on the deployment basket.

Step 810 comprises transferring the plurality of nodes from the node basket to the underwater vehicle. In one embodiment, a single tray is removed from the node basket at a time and transferred to the ROV skid. In one embodiment, this step may comprise actuating the chain drive mechanism on the stinger tray to pull a tray from the deployment basket (loaded with nodes) fully into the ROV skid. One of the sensors (such as the tray end stop sensor) may confirm that the tray is fully home within the ROV skid. Once the tray is collected and secured, the stinger may be retracted back into the ROV skid. One of the sensors (such as the stinger extend/retract sensor) may confirm that the stinger has fully retracted.

Step 812 comprises undocking the ROV skid from the deployment basket. This step is essentially the reverse of docking step 806, and is known in the art based on the particular docking components utilized.

Step 814 comprises deploying the seismic nodes on the seabed from the ROV. This step may comprise moving the ROV to the intended deployment position. In one embodiment, this step comprises moving at least one of the autonomous seismic nodes on the ROV skid to a deployment position on the ROV skid. In one embodiment, a chain drive of the ROV skid is actuated to make the first row of nodes available to an ROV manipulator located on a front end of the ROV. Each node on the front row may then be deployed at the intended subsea position. A second row of nodes may then be moved to a deployment position within the ROV for subsequent handling by the ROV manipulator. Such steps may be done manually or automatically by a control system. In one embodiment, a plurality of sensors and/or cameras allow the ROV operator monitor the relative position of mechanisms and nodes and intervene as required. In one embodiment, once the first row of nodes has been deployed, the hydraulically actuated flappers and tray chain drive mechanism are used in unison to move the remaining nodes further forward on the tray so that a single row is always available to the ROV manipulator during deployment operations until all seismic nodes have been installed on the seabed. In one embodiment, once the tray is empty, the tray is transferred to the deployment basket and a new tray (loaded with seismic nodes) is retrieved from the basket and loaded onto the ROV skid during a single docking step.

FIG. 9 illustrates one embodiment of a method for transferring seismic nodes from a subsea basket to a ROV. Step 902 comprises providing a subsea basket with a plurality of seismic nodes at a plurality of different levels within the subsea basket. The subsea basket may or may not be directly coupled to a surface vessel. The subsea basket may comprise a first plurality of seismic nodes at a first level and a second plurality of seismic nodes at a second level. Each of the seismic nodes may be located on a tray or similar node holder, which may or may not be located on a tray platform or other transfer mechanism on the subsea basket. An underwater vehicle (such as an ROV) may be coupled to the subsea basket via procedures and components known to skill in the art.

Step 904 comprises moving an elevator assembly (with corresponding seismic nodes) vertically to a different position within the subsea basket. This step may include actuating an elevator mechanism within the subsea basket to move any seismic nodes coupled to or within the elevator system from their initial position to a first vertical position. The first vertical position may be the position to transfer a desired tray between the subsea basket and the underwater vehicle. In one embodiment, the first vertical position is the position that it is safe to extend a stinger mechanism from the underwater vehicle into the subsea basket. The use of one or more visual indicators on the subsea basket may be utilized to move the elevator assembly to the desired position. In some embodiments, all of the seismic nodes at different vertical levels are moved at the same time, while in other embodiments only the desired level of seismic nodes is moved. In some embodiments, movement of the elevator assembly directly moves the tray, tray platform, or other node holder on which the nodes sit upon. The actuation of the elevator mechanism may be performed by a hot stab on the ROV.

Step 906 comprises extending a transfer mechanism (such as a stinger mechanism or stinger tray) from an underwater vehicle (such as a ROV or a ROV skid) to the subsea basket. In some embodiments, the transfer mechanism is coupled to the seismic nodes or to the tray or tray platform holding the seismic nodes. In other embodiments, the transfer mechanism simply extends underneath the seismic nodes or tray or tray platform.

Step 908 comprises moving the elevator assembly (with the coupled seismic nodes) from the first vertical position to the second vertical position within the subsea basket. This step is intended to position the seismic nodes on the transfer mechanism that has already been extended within the subsea basket. The use of one or more visual indicators on the subsea basket may be utilized to move the elevator assembly to the desired position. If the transfer mechanism is already coupled to the tray or tray platform, then this step may be omitted.

Step 910 comprises coupling the transfer mechanism to a first plurality of seismic nodes. This step may comprise directly coupling the seismic nodes, coupling a tray (or other node holder) that carries the nodes, or by engaging a tray platform or rails on which the tray sits upon within the basket. This step may further include engaging a grabbing mechanism on the extending transfer mechanism with portions of the tray to facilitate movement of the tray from the subsea basket to the ROV. For example, a chain drive on the ROV and/or stinger mechanism may be configured to engage with portions of the tray. For example, a plurality of capture dogs on a chain drive may fit into corresponding openings on the bottom of a tray. In some embodiments steps 908 and 910 are effectively combined, such that movement of the elevator assembly effectively couples the seismic odes to the transfer mechanism.

Step 912 comprises moving the first plurality of seismic nodes from the subsea basket back into the ROV (and/or the ROV skid) with the seismic nodes attached and/or coupled to the transfer mechanism. This step may include moving a tray or other node holder with the seismic nodes loaded on the tray. In one embodiment, movement of a chain drive moves the tray forward or reverse relative to the ROV and/or the subsea basket.

Step 914 comprises moving the elevator assembly from the second vertical position (e.g., the position in which the seismic nodes were transferred to the ROV) to a different vertical position within the subsea basket, such as the first vertical position. This step is intended to position the elevator assembly within the subsea basket at a safe position to safely retract the transfer mechanism from the subsea basket into the ROV. The use of one or more visual indicators on the subsea basket may be utilized to move the elevator assembly to the desired position.

Step 916 comprises retracting the transfer mechanism (such as a stinger mechanism or stinger tray) from the subsea basket to the ROV. In some embodiments, the transfer mechanism is at least partially coupled to the seismic nodes or to the tray or tray platform holding the seismic nodes. In some embodiments, this step can be performed simultaneously with raising a portion of the elevator assembly to safely retract the stinger mechanism.

In some embodiments, during the same docking operation between the ROV and the subsea basket, a second plurality of seismic nodes may be transferred to the ROV. Similar to transferring the first plurality of seismic nodes, the node holder, tray, or platform carrying the second plurality of seismic nodes (at a different height than the first plurality of seismic nodes) may be vertically moved to the desired vertical position(s) within the subsea basket for engagement with a transfer mechanism (e.g., an extending stinger tray) from the ROV. Also, while not shown, prior to transferring the first plurality of seismic nodes to the ROV, an empty tray on the ROV may be loaded onto the subsea basket from the ROV and during the same docking step a second tray loaded with seismic nodes transferred to the ROV. Transferring an empty transfer between the subsea devices may be performed generally in the same manner (but reverse) as that described in method 900. Further, once the seismic nodes on the ROV have been deployed, the empty trays may be loaded back into the subsea basket in a generally reverse procedure as described above.

All of the systems and methods disclosed and claimed herein can be made and executed without undue experimentation in light of the present disclosure. While the apparatus and methods of this invention have been described in terms of preferred embodiments, it will be apparent to those of skill in the art that variations may be applied to the methods and in the steps or in the sequence of steps of the method described herein without departing from the concept, spirit and scope of the invention. In addition, modifications may be made to the disclosed apparatus and components may be eliminated or substituted for the components described herein where the same or similar results would be achieved. All such similar substitutes and modifications apparent to those skilled in the art are deemed to be within the spirit, scope, and concept of the invention.

Many other variations in the configurations of the docking system are within the scope of the invention. For example, other holdings devices besides trays may be used, and other structures besides tray platforms may hold the trays or seismic nodes. For example, instead of trays, the seismic nodes may be located on one or more horizontal support slides. As another example, other devices or payloads besides autonomous seismic nodes may be loaded onto the deployment basket and ROV skid. As still another example, the underwater vehicle may be any unmanned underwater vehicle (UUV), autonomous underwater vehicle (AUV), remotely operated vehicle (ROV), or even a manned submersible. As still another example, the ROV may dock to any subsea structure, whether stationary or moving, such as subsea equipment located on or near the ocean floor, a subsea vessel, subsea equipment located anywhere between the surface and the seabed, and a lowerable basket or skid. As still another example, a retractable stinger mechanism on the ROV may or may not be used to transfer seismic nodes between the subsea basket and ROV. It is emphasized that the foregoing embodiments are only examples of the very many different structural and material configurations that are possible within the scope of the present invention.

Although the invention(s) is/are described herein with reference to specific embodiments, various modifications and changes can be made without departing from the scope of the present invention(s), as presently set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

What is claimed is:

1. A subsea basket for the subsea transfer of a plurality of seismic nodes, comprising
   a frame having an elevator assembly; and
   a plurality of node holders coupled to the elevator assembly, wherein each node holder is configured to hold a plurality of seismic nodes, wherein the plurality of node holders comprises a first node holder at a first vertical height and a second node holder at a second vertical height,
   wherein the elevator assembly is configured to vertically move the plurality of node holders with the plurality of seismic nodes within the frame,
   wherein the basket is configured to horizontally transfer the plurality of seismic nodes from the subsea basket to an underwater vehicle.

2. The basket of claim 1, wherein each of the plurality of node holders comprises a tray.

3. The basket of claim 1, wherein each of the plurality of node holders comprises at least one locking mechanism for securely attaching the node holder to the subsea basket.

4. The basket of claim 1, wherein the elevator assembly comprises a plurality of lead screw assemblies that is configured to move the plurality of node holders between different vertical positions within the subsea basket.

5. The basket of claim 1, wherein the elevator assembly comprises one or more hydraulic cylinders that is configured to move the plurality of node holders between different vertical positions within the subsea basket.

6. The basket of claim 1, wherein the elevator assembly is configured to be powered by a hot stab of a remotely operated vehicle.

7. The basket of claim 1, wherein the elevator assembly comprises a plurality of vertical guiding rods.

8. The basket of claim 1, comprising a plurality of retractable stabilizing devices coupled to a plurality of corners on the frame.

9. The basket of claim 1, comprising a plurality of position indicators configured to position the plurality of node holders at one or more predetermined vertical positions within the frame for transfer of the plurality of seismic nodes to the underwater vehicle.

10. The basket of claim 1, wherein the plurality of seismic nodes comprises a first plurality of seismic nodes at a first vertical height in the subsea basket and a second plurality of seismic nodes at a second vertical height in the subsea basket.

11. The basket of claim 10, wherein the elevator assembly is configured to vertically move the first plurality of seismic nodes and the second plurality of seismic at the same time.

12. A system for the subsea transfer of a plurality of seismic nodes, comprising
   a seismic node transfer device configured to hold a plurality of seismic nodes at a plurality of different levels within the node transfer device, wherein the node transfer device comprises an elevator assembly coupled to a plurality of node holders, wherein a first portion of the plurality of seismic nodes is located on a first node holder at a first vertical height and a second portion of the plurality of seismic nodes is located on a second node holder at a second vertical height, wherein the elevator assembly is configured to vertically move the plurality of seismic nodes within the node transfer device; and
   an underwater vehicle configured to horizontally transfer the plurality of seismic nodes from the node transfer device to the underwater vehicle.

13. The system of claim 12, wherein the seismic node transfer device is a subsea basket and the underwater vehicle is a remotely operated vehicle (ROV).

14. The system of claim 1, wherein the ROV comprises a transfer mechanism that is configured to extend and retract from the ROV and transfer the plurality of node holders from the subsea basket to the ROV.

15. The system of claim 1,
   wherein the subsea basket is configured to transfer the plurality of seismic nodes from the subsea basket to the ROV at a single vertical docking position of the basket.

16. A method for the subsea transfer of seismic nodes, comprising
   coupling an underwater vehicle to a subsea basket, wherein the subsea basket comprises a first plurality of seismic nodes at a first vertical position, wherein the first plurality of seismic nodes is located on a node holder;
   positioning the first plurality of seismic nodes in the node basket from the first vertical position to a second vertical position within the subsea basket; and
   transferring the first plurality of seismic nodes from the subsea basket to the underwater vehicle by transferring the node holder from the subsea basket to the underwater vehicle.

17. The method of claim 16, wherein the positioning step comprises vertically moving the first plurality of seismic nodes within the subsea basket by actuating one or more lead screw assemblies or hydraulic cylinders within the subsea basket.

18. The method of claim 16, wherein the transferring step comprises aligning the node holder within the basket to a desired vertical position for alignment with a transfer mechanism of the underwater vehicle, and extending the transfer mechanism into the subsea basket and coupling the transfer mechanism to the node holder for removal of the first plurality of seismic nodes.

\* \* \* \* \*